(12) United States Patent
Boudreau et al.

(10) Patent No.: US 10,075,808 B2
(45) Date of Patent: *Sep. 11, 2018

(54) METHODS AND APPARATUS FOR PROVIDING MAP LOCATIONS IN USER APPLICATIONS USING URL STRINGS

(71) Applicant: BlackBerry Limited, Waterloo (CA)

(72) Inventors: Jesse Boudreau, Kanata (CA); Ronald Anthony Dicke, Ottawa (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/661,830

(22) Filed: Jul. 27, 2017

(65) Prior Publication Data
US 2017/0325060 A1   Nov. 9, 2017

Related U.S. Application Data

(63) Continuation of application No. 15/082,480, filed on Mar. 28, 2016, now Pat. No. 9,723,438, which is a
(Continued)

(51) Int. Cl.
*G06F 17/30* (2006.01)
*H04W 4/02* (2018.01)
(Continued)

(52) U.S. Cl.
CPC .............. *H04W 4/02* (2013.01); *G01C 21/20* (2013.01); *G01C 21/26* (2013.01);
(Continued)

(58) Field of Classification Search
USPC ........................................................ 709/206
See application file for complete search history.

(56) References Cited

U.S. PATENT DOCUMENTS 5,289,572 A   2/1994   Yano et al.
5,559,938 A   9/1996   Van Roekel et al.
(Continued)

FOREIGN PATENT DOCUMENTS

EP   0908835 A2   4/1994
EP   0875729 A2   11/1998
(Continued)

OTHER PUBLICATIONS

Shauna Kelly, "How do I control how a Word document opens from the internet or an intranet?", http://shaunakelly.com/word/sharing/opendocinie.html, dated Jun. 2004.
(Continued)

*Primary Examiner* — Mahesh H Dwivedi
(74) *Attorney, Agent, or Firm* — Moffat & Co.

(57) ABSTRACT

Techniques for use in a wireless communication device for displaying a map are described. The device receives via a user interface a selection of a hypertext link object in an electronic file or message. The object is associated with a URL string which includes a server address and location data corresponding to a location. When a mapping application is installed in the device, the device executes the mapping application for rendering a map of the location in response to receiving the selection of the object. When the mapping application is not installed in the device, the device executes a web browser of the device for receiving and displaying a map image of the location in response to receiving the selection of the object.

15 Claims, 25 Drawing Sheets

Related U.S. Application Data continuation of application No. 14/334,807, filed on Jul. 18, 2014, now Pat. No. 9,298,838, which is a continuation of application No. 13/451,100, filed on Apr. 19, 2012, now Pat. No. 8,788,604, which is a continuation of application No. 13/150,752, filed on Jun. 1, 2011, now Pat. No. 8,166,083, which is a continuation of application No. 12/781,397, filed on May 17, 2010, now Pat. No. 7,970,807, which is a continuation of application No. 11/483,215, filed on Jul. 7, 2006, now Pat. No. 7,720,893.

(60) Provisional application No. 60/787,872, filed on Mar. 21, 2006, provisional application No. 60/787,541, filed on Mar. 31, 2006.

(51) Int. Cl.
*G01C 21/20* (2006.01)
*G01C 21/26* (2006.01)
*G09B 29/10* (2006.01)
*H04L 29/12* (2006.01)
*H04L 29/08* (2006.01)
*H04M 1/725* (2006.01)

(52) U.S. Cl.
CPC .... *G06F 17/3087* (2013.01); *G06F 17/30241* (2013.01); *G06F 17/30876* (2013.01); *G06F 17/30882* (2013.01); *G06F 17/30887* (2013.01); *G09B 29/106* (2013.01); *H04L 29/12594* (2013.01); *H04L 61/1511* (2013.01); *H04L 61/30* (2013.01); *H04L 61/3025* (2013.01); *H04L 67/18* (2013.01); *H04M 1/72525* (2013.01); *Y10S 707/919* (2013.01); *Y10S 707/92* (2013.01)

(56) References Cited

U.S. PATENT DOCUMENTS

| | | | |
|---|---|---|---|
| 6,230,098 B1 | 5/2001 | Ando et al. | |
| 6,240,360 B1 | 5/2001 | Phelan | |
| 6,278,940 B1 | 8/2001 | Endo | |
| 6,288,704 B1 | 9/2001 | Flack et al. | |
| 6,493,630 B2 | 12/2002 | Ruiz et al. | |
| 6,546,634 B2 | 4/2003 | Fukuchi et al. | |
| 6,664,989 B1 | 12/2003 | Snyder et al. | |
| 6,683,626 B1 | 1/2004 | Abellera | |
| 6,728,635 B2 | 4/2004 | Hamada et al. | |
| 6,795,856 B1 | 9/2004 | Bunch | |
| 6,823,255 B2 | 11/2004 | Ahrens et al. | |
| 6,983,203 B1 | 1/2006 | Wako | |
| 7,089,507 B2 | 8/2006 | Lection et al. | |
| 7,158,878 B2 | 1/2007 | Rasmussen et al. | |
| 7,472,338 B2 | 12/2008 | Carro | |
| 7,584,049 B2 | 9/2009 | Nomura | |
| 7,720,893 B2 * | 5/2010 | Boudreau | G01C 21/20 707/919 |
| 7,970,807 B2 * | 6/2011 | Boudreau | G01C 21/20 707/920 |
| 8,166,083 B2 * | 4/2012 | Boudreau | G01C 21/20 707/920 |
| 8,788,604 B2 * | 7/2014 | Boudreau | G01C 21/20 707/920 |
| 9,298,838 B2 * | 3/2016 | Boudreau | G01C 21/20 |
| 9,723,438 B2 * | 8/2017 | Boudreau | H04W 4/02 |
| 2002/0041328 A1 | 4/2002 | LeCompte et al. | |
| 2002/0174360 A1 | 11/2002 | Ikeda | |
| 2003/0120752 A1 | 6/2003 | Corcoran | |
| 2003/0182052 A1 | 9/2003 | DeLorme et al. | |
| 2003/0184594 A1 | 10/2003 | Ellenby et al. | |
| 2003/0229441 A1 | 12/2003 | Pechatnikov et al. | |
| 2004/0090349 A1 | 5/2004 | Iwata | |
| 2004/0209601 A1 | 10/2004 | Obradovich et al. | |
| 2004/0257340 A1 | 12/2004 | Jawerth | |
| 2005/0023224 A1 | 2/2005 | Beatty | |
| 2005/0033511 A1 | 2/2005 | Pechatnikov et al. | |
| 2005/0064887 A1 | 3/2005 | Bengtsson et al. | |
| 2005/0114021 A1 | 5/2005 | Krull et al. | |
| 2005/0246444 A1 | 11/2005 | Koehane | |
| 2006/0190833 A1 | 8/2006 | SanGiovanni et al. | |
| 2006/0242605 A1 | 10/2006 | Kim et al. | |
| 2007/0016651 A1 * | 1/2007 | Blagsvedt | G01C 21/00 709/217 |
| 2007/0100928 A1 | 5/2007 | Sylthe | |
| 2007/0118520 A1 | 5/2007 | Bliss | |
| 2007/0192840 A1 | 8/2007 | Pesonen | |
| 2008/0082262 A1 | 4/2008 | Silva et al. | |
| 2009/0055774 A1 | 2/2009 | Joachim | |
| 2012/0221239 A1 | 8/2012 | Cooper | |
| 2012/0226760 A1 | 9/2012 | Lewis | |

FOREIGN PATENT DOCUMENTS

| | | |
|---|---|---|
| EP | 1464922 A1 | 10/2004 |
| EP | 1477911 A1 | 11/2004 |
| EP | 1710713 A1 | 10/2006 |
| JP | 2005301196 | 10/2005 |
| WO | 86002764 A1 | 5/1986 |
| WO | 9700747 A1 | 1/1997 |
| WO | 9707467 A1 | 2/1997 |
| WO | 0127812 A2 | 4/2001 |
| WO | 0165518 A2 | 9/2001 |
| WO | 2003087725 A2 | 10/2003 |
| WO | 2004076977 A2 | 9/2004 |

OTHER PUBLICATIONS

Apple, "iTunes 3", http://web.archive.org/web/20030201232422/http://www.apple.com/itunes/, dated Feb. 1, 2003.

Stanley, "Application Deep Linking from the BlackBerry Browser", dated Oct. 29, 2010.

* cited by examiner

FIG. 1
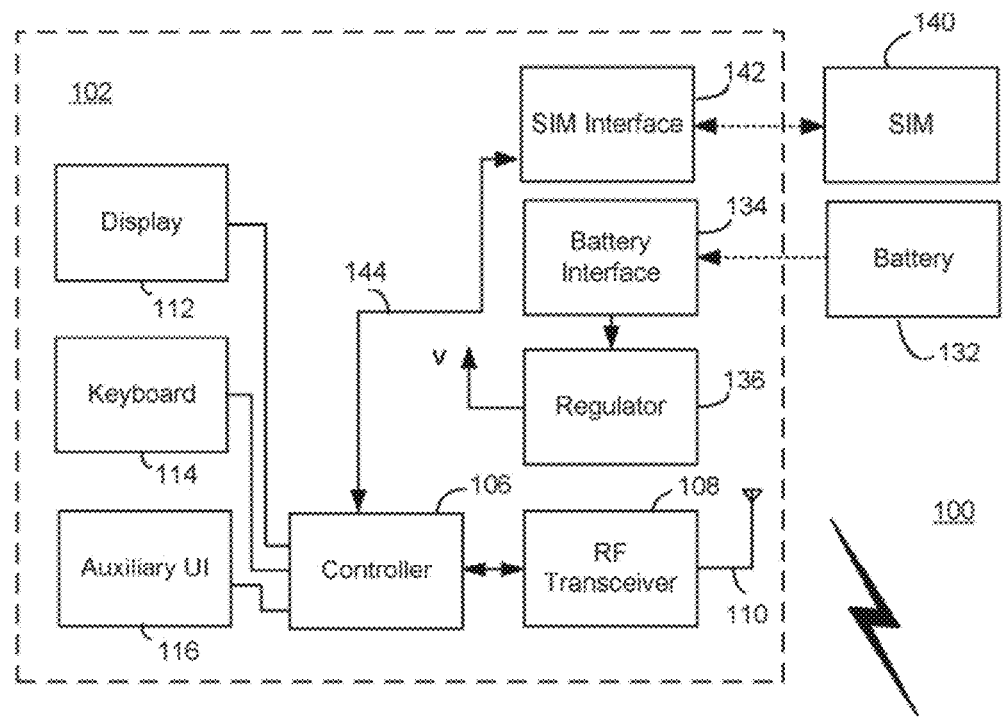
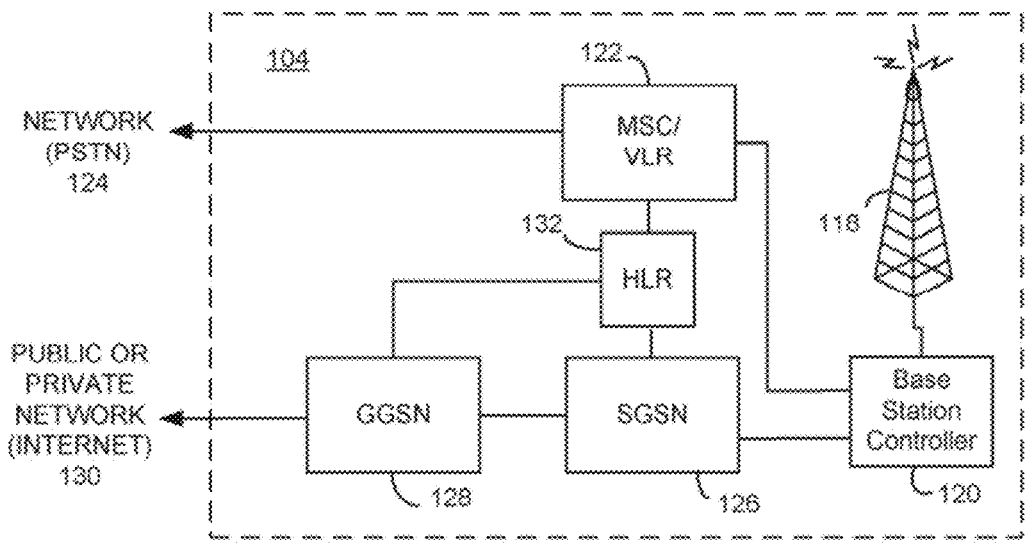

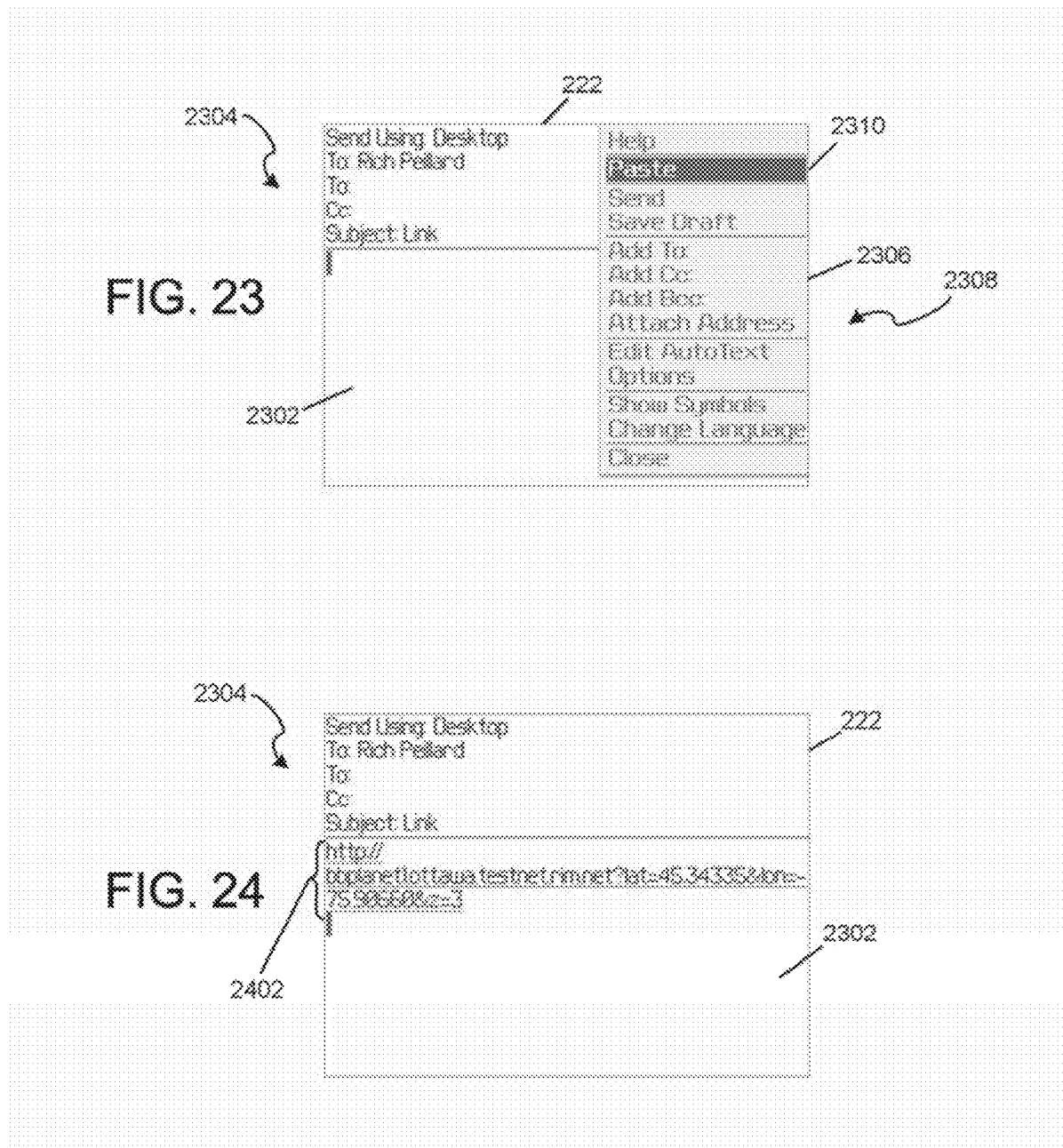

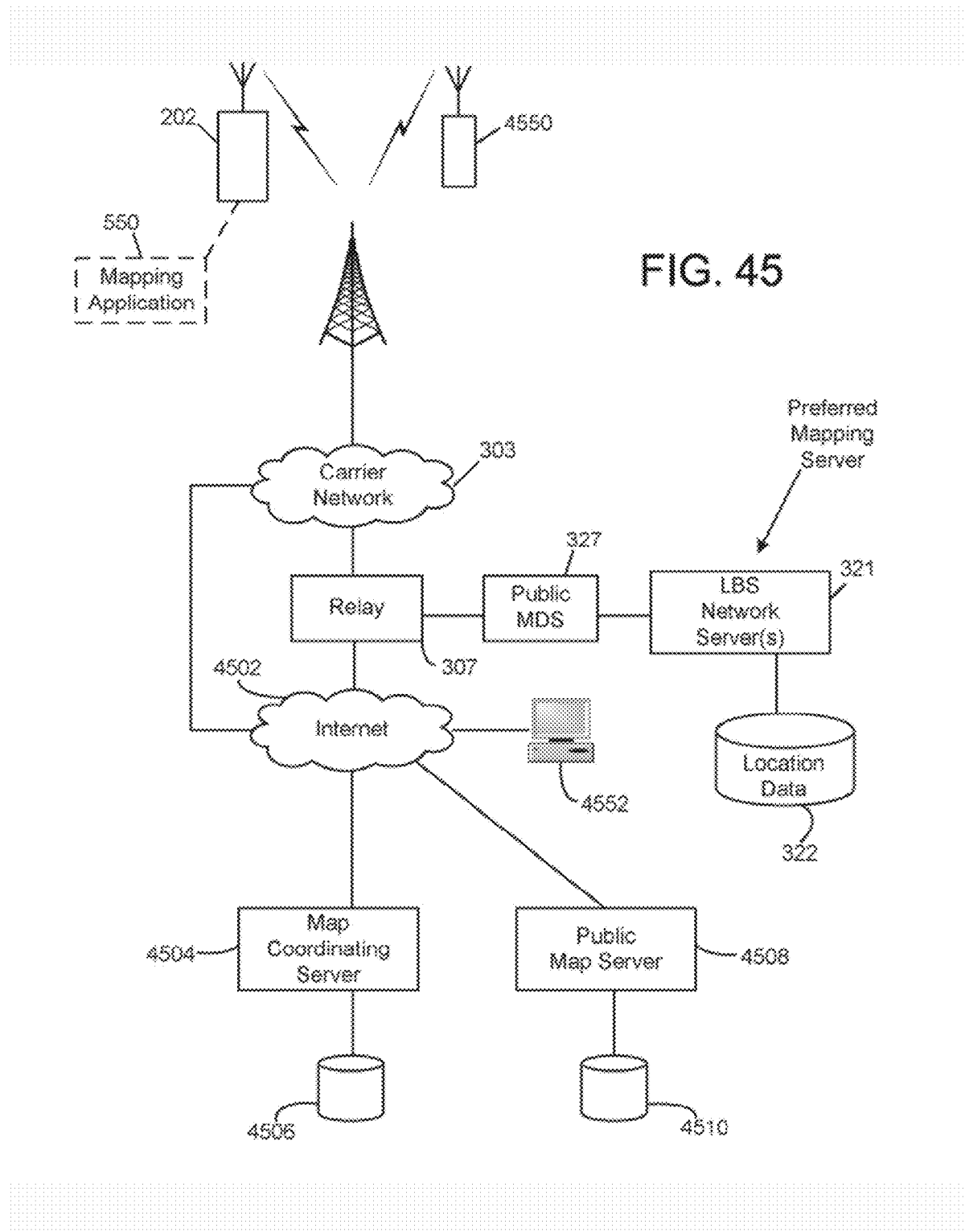

METHODS AND APPARATUS FOR PROVIDING MAP LOCATIONS IN USER APPLICATIONS USING URL STRINGS

CROSS-REFERENCE TO RELATED APPLICATIONS

The present application is a continuation of and claims priority to U.S. non-provisional patent application having application Ser. No. 15/082,480 and a filing date of Mar. 28, 2016, which is a continuation of and claims priority to U.S. non-provisional patent application Ser. No. 14/334,807 and filing date of 18 Jul. 2014, now U.S. Pat. No. 9,298,838, which is a continuation of and claim priority to U.S. non-provisional patent application having application Ser. No. 13/451,100 and filing date of 19 Apr. 2012, now U.S. Pat. No. 8,788,604, which is a continuation of and claims priority to U.S. non-provisional patent application having application Ser. No. 13/150,752 and filing date of 1 Jun. 2011, now U.S. Pat. No. 8,166,083, which is a continuation of and claims priority to U.S. non-provisional patent application having application Ser. No. 12/781,397 and filing date of 17 May 2010, now U.S. Pat. No. 7,970,807, which is a continuation of and claims priority to U.S. non-provisional patent application having application Ser. No. 11/483,215 and filing date of 7 Jul. 2006, now U.S. Pat. No. 7,720,893, which claims priority to U.S. provisional patent application having application No. 60/787,872 and filing date of 31 Mar. 2006, and U.S. provisional patent application having application No. 60/787,541 and filing date of 31 Mar. 2006, each application being hereby incorporated by reference herein.

BACKGROUND

Field of the Technology

The present disclosure relates generally to providing map locations in user applications for the visual display of maps in computer devices including mobile communication devices.

Description of the Related Art

Increasingly, mobile communication devices operating in wireless communication networks are provided with mapping capabilities for presenting visually displayed maps of geographic locations. Traditionally, visually displayed maps for computer devices have been limited to those based on bitmap images which are relatively large files. In recent years, newer and even more elaborate mapping capabilities for computer devices have been devised. Mobile communication devices, which typically operate with use of one or more batteries or battery packs, however, typically have relatively limited memory and processing power as compared to larger computer devices such as personal computers (PCs) or even laptop computers. It is generally desirable to minimize the use of memory and communication bandwidth (radio bandwidth or otherwise) resources.

Accordingly, there is a need for providing map locations in user applications for the visual display of maps, especially in mobile communication devices which operate in wireless communication networks as well as other computer devices, by fully exploiting the capabilities of such devices and minimzing memory and/or communication bandwidth resources where possible.

BRIEF DESCRIPTION OF THE DRAWINGS

Embodiments of present invention will now be described by way of example with reference to attached figures, wherein:

FIG. 1 is a block diagram which illustrates pertinent components of a mobile communication device and a wireless communication network of a communication system;

FIGS. 21-24 are sequential views of the display to further illustrate the method of FIG. 8 in connection with any file or message using a COPY function and a PASTE function;

FIG. 45 is a system diagram of network components for use with the method of FIG. 44.

DETAILED DESCRIPTION OF THE PREFERRED EMBODIMENTS

Figure 2:
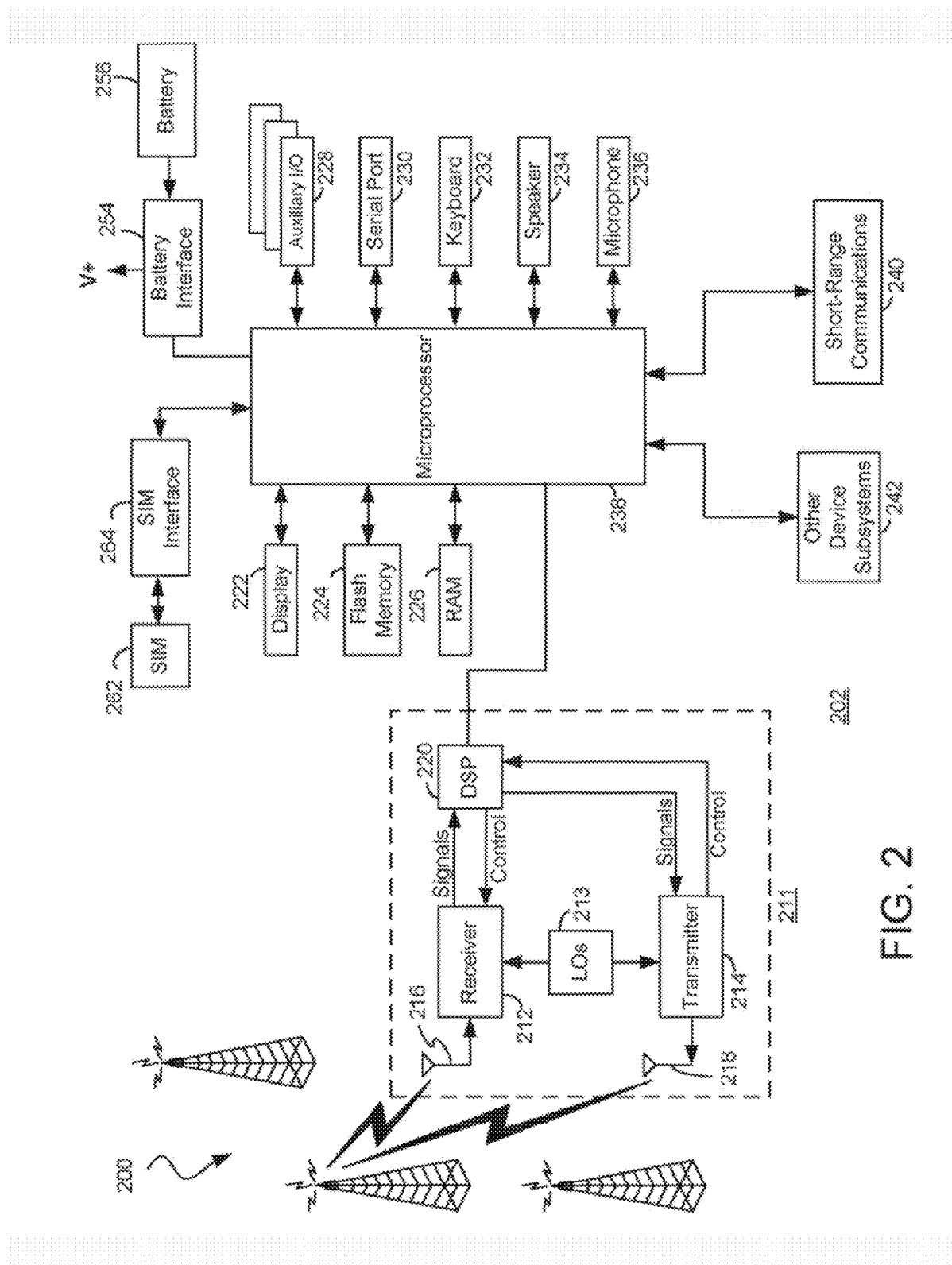
FIG. 2 is a more detailed diagram of a preferred mobile communication device of FIG. 1, namely, a mobile station.

Methods and apparatus for use in mapping a location in a computer device are described herein. In one illustrative example, the method includes the steps of receiving an electronic file or message which includes a hypertext link mapping indicator associated with a uniform resource locator (URL) string having a server address and latitude and longitude coordinates; receiving, through a user interface of the computer device, an end user selection of the hypertext link mapping indicator in the electronic file or message; and in response to the end user selection of the hypertext link mapping indicator: if a predetermined type of mapping application is provided in the computer device, invoking a mapping function of the mapping application to produce a map of a location corresponding to the latitude and longitude coordinates for visual display in a display of the computer device (e.g. based on received maplet data); and if the predetermined type of mapping application type is not provided in the computer device, requesting and receiving map data from a map coordinating server identified by the server address of the URL string to produce a map of the location for visual display in the display (e.g. based on a bitmap image). If the predetermined type of mapping application is not provided in the computer device, and the computer device or associated browser is identified as not being that of a mobile communication device (i.e. the computer device has higher processing capabilities), then the computer device causes a request to be sent to the map coordinating server at the server address and, in response to the request, receives a redirection from the map coordinating server to an interactive map server at an interactive map server address and further requests and receives map data from the interactive map server at the interactive map server address to produce a map of the location for visual display in the display. Advantageously, processing of the received hypertext link mapping indicator is handled differently depending on the type of device or whether a predetermined mapping application is installed in the device, so that optimal mapping functionality is provided for different device environments.

FIG. 1 is a block diagram of a communication system 100 which includes a mobile station 102 (one type of wireless or mobile communication device) which communicates through a wireless communication network 104. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110. Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of station 118 and BSC 120, including for example modulation/demodulation and possibly encoding/decoding and encryption/decryption. It is also contemplated that RF transceiver circuitry 108 may perform certain functions in addition to those performed by BSC 120. It will be apparent to those skilled in art that RF transceiver circuitry 108 will be adapted to particular wireless network or networks in which mobile station 102 is intended to operate.

Mobile station 102 includes a battery interface 134 for receiving one or more rechargeable batteries 132. Battery 132 provides electrical power to electrical circuitry in mobile station 102, and battery interface 134 provides for a mechanical and electrical connection for battery 132. Battery interface 134 is coupled to a regulator 136 which regulates power to the device. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface 142. SIM 140 is one type of a conventional "smart card" used to identify an end user (or subscriber) of mobile station 102 and to personalize the device, among other things. Without SIM 140, the mobile station terminal is not fully operational for communication through wireless network 104. By inserting SIM 140 into mobile station 102, an end user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may consist of a single unit, such as a data communication device, a cellular telephone, a Global Positioning System (GPS) unit, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 402 of FIG. 2.

Mobile station 102 communicates in and through wireless communication network 104. Wireless communication network 104 may be a cellular telecommunications network. In the embodiment of FIG. 1, wireless network 104 is configured in accordance with Global Systems for Mobile Communications (GSM) and General Packet Radio Service (GPRS) technologies. Although wireless communication network 104 is described herein as a GSM/GPRS type network, any suitable network technologies may be utilized such as Code Division Multiple Access (CDMA), Wideband CDMA (WCDMA), whether 2G, 3G, or Universal Mobile Telecommunication System (UMTS) based technologies. In this embodiment, the GSM/GPRS wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a fixed transceiver station, and station 118 and BSC 120 may be referred to as transceiver equipment. The transceiver equipment provides wireless network coverage for a particular coverage area commonly referred to as a "cell". The transceiver equipment transmits communication signals to and receives communication signals from mobile stations within its cell via station 118. The transceiver equipment normally performs such functions as modulation and possibly encoding and/or encryption of signals to be transmitted to the mobile station in accordance with particular, usually predetermined, communication protocols and parameters, under control of its controller. The transceiver equipment similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells, each served by a station 118 (i.e. or station sector), depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile station 102 or by the transceiver equipment instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN, notifications of incoming GPRS data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

FIG. 2 is a detailed block diagram of a preferred mobile station 202 of the present disclosure. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a Subscriber Identity Module or "SIM" card 262 to be inserted in a SIM interface 264 in order to operate in the network. SIM 262 includes those features described in relation to FIG. 1. Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides a regulated voltage V to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, as well as techniques of the present disclosure, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In the present disclosure, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3A:
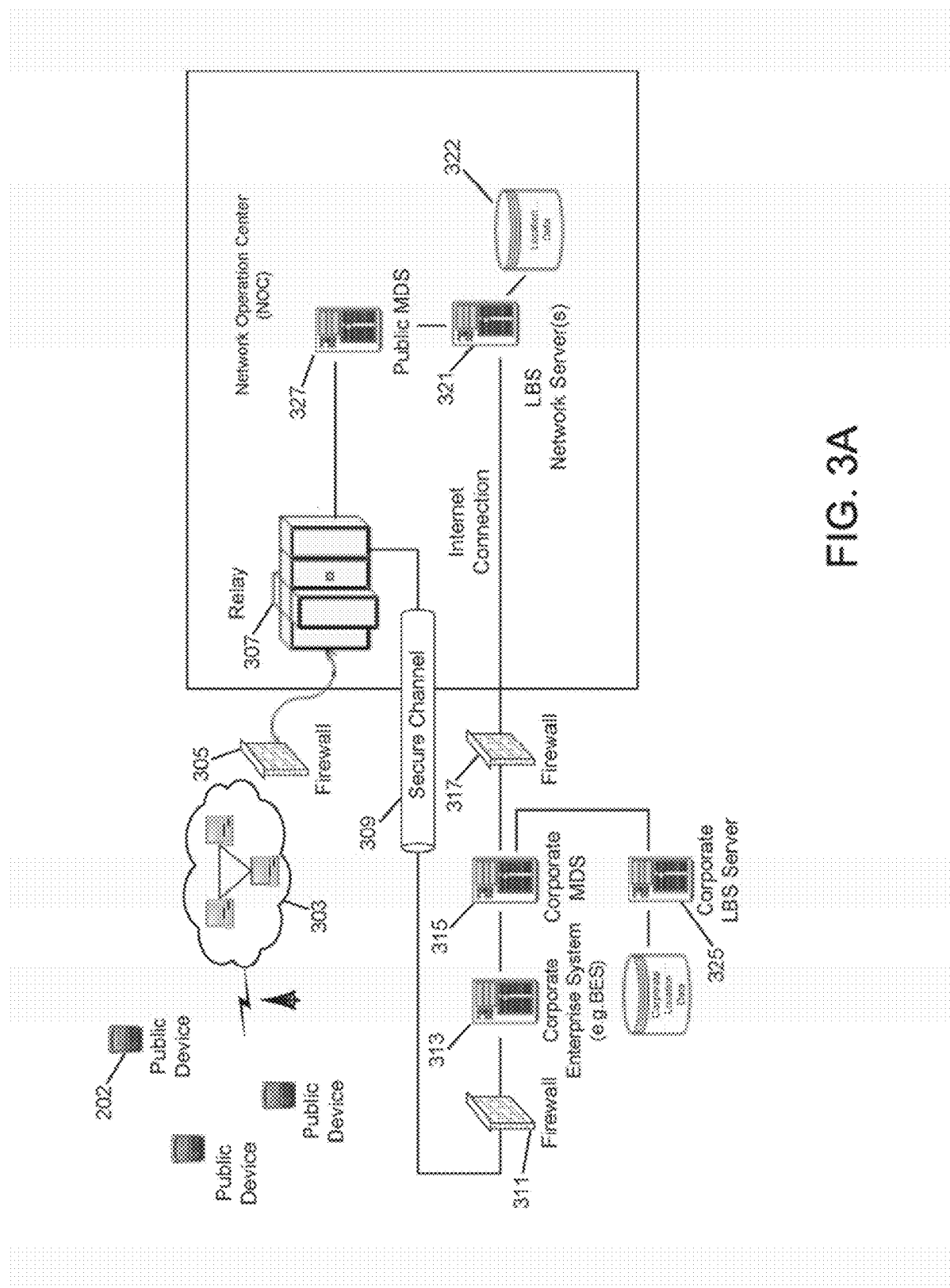
FIG. 3A is a system diagram of network components which provide mapping functionality in the mobile communication devices of FIGS. 1 and 2.

FIG. 3A is a system diagram of network components which provide mapping functionality in the mobile communication devices of FIGS. 1 and 2. To achieve this, a mapping application is also provided in memory of the mobile communication device (e.g. a mapping application 550 of FIG. 5) for rendering of visual maps in its display. Mobile communication devices, such as mobile station 202, are connected over a mobile carrier network 303, for communication through a firewall 305 to a relay 307. A request for map data from any one of the mobile communication devices is received at relay 307 and passed via a secure channel 309 through firewall 311 to a corporate enterprise server 313 and corporate mobile data system (MDS) server 315. The request is then passed via firewall 317 to a public location-based service (LBS) server 321 which provides location-based services (LBS) to handle the request. The network may include a plurality of such LBS servers where requests are distributed and processed through a load distributing server. The LBS data may be stored on this network server 321 in a network database 322, or may be stored on a separate LBS data server (not shown). Private corporate data stored on corporate LBS server 325 may be added to the public data via corporate MDS server 315 on the secure return path to mobile station 202. Alternatively, where no corporate servers provided, the request from mobile station 202 may be passed via relay 307 to a public MDS server 327, which sends the request to public LBS server 321 providing LBS to handle the request.

A Maplet data structure is provided that contains all of the graphic and labeled content associated with a geographic area (e.g. map features such as restaurants (point features), streets (line features), or lakes (polygon features)). Maplets are structured in Layers of "DEntries" (Data Entries) identified by a "Layer ID" to enable data from different sources to be deployed to the device and meshed for proper rendering. Each DEntry is representative of one or more artifact or label (or a combination of both) and includes coordinate information (also referred to a "bounding box" or "bounding area") to identify the area covered by the DEntry and a plurality of data Points that together represent the artifact or label. For example, a DEntry may be used to represent a street on a city map (or a plurality of streets), wherein the various Points within the DEntry are separated into different parts representing various portions of the artifact (e.g. portions of a street). A mobile device may issue a request for the map server to download only those DEntries that are included within a specified area or bounding box representing an area of interest that can be represented by, for example, a pair of bottom left, top right coordinates.

As discussed later below with reference to FIG. 3B, the mobile device issues one or more AOI (Area of Interest) requests, DEntry or data requests and Maplet Index requests to the map server, for selective downloading of map data based on user context Thus, rather than transmitting the entire map data with each request from the device, local caching may be used within the mobile device in conjunction with context filtering of map data on the server. For example, if a user's mobile device is GPS enabled and the user is traveling in an automobile at 120 km/hr along a freeway then context filtering can be employed to prevent downloading of map data relating to passing side streets. Or, if the user is traveling in an airplane at 30,000' then context filtering can be employed to prevent downloading of map data for any streets whatsoever. Also, a user's context can be defined, for example, in terms of occupation (e.g. a user whose occupation is transport truck driver can employ context filtering to prevent downloading of map data for side streets on which the user's truck is incapable of traveling, or a user whose occupation is to replenish supplies of soft drink dispensing machines can employ context filtering to download public map data showing the user's geographical area of responsibility with irrelevant features such as lakes or parks filtered out and private map data containing the location of soft drink dispensing machines superimposed on the public map data.

The Maplet Index request results in a Maplet Index (i.e. only a portion of the Maplet that provides a table of contents of the map data available within the Maplet rather than the entire Maplet) being downloaded from the map server to the device, thereby conserving OTA (Over-the-Air) bandwidth and device memory caching requirements. The Maplet Index conforms to the same data structure as a Maplet, but omits the data Points. Consequently, the Maplet Index is small (e.g. 300-400 bytes) relative to the size of a fully populated Maplet or a conventional bit map, and includes DEntry bounding boxes and attributes (size, complexity, etc.) for all artifacts within the Maplet. As the field of view changes (e.g. for a location-aware device that displays a map while moving), the device (client) software assesses whether or not it needs to download additional data from the server. Thus, as discussed above, if the size attribute or complexity attribute of an artifact that has started to move into the field of view of the device (but is not yet being displayed) is not relevant to the viewer's current context, then the device can choose not to display that portion of the artifact. On the other hand, if the portion of the artifact is appropriate for display then the device accesses its cache to determine whether the DEntries associated with that portion of the artifact have already been downloaded, in which case the cached content is displayed. Otherwise, the device issues a request for the map server to download all of the DEntries associated with the artifact portion.

By organizing the Maplet data structure in Layers, it is possible to seamlessly combine and display information obtained from public and private databases. For example, it is possible for the device to display an office building at a certain address on a street (e.g. 1st z-order attribute from public database), adjacent a river (e.g. $2^{nd}$ z-order attribute from public database), with a superimposed floor plan of the building to show individual offices (e.g. $11^{th}$ z-order attribute from a private database, accessible through a firewall).

Referring back to FIG. 3A, within the network having LBS server(s) 321 and database(s) 322 accessible to it, all of the map data for the entire world is divided and stored as a grid according to various levels of resolution (zoom), as set forth below in Table A. Thus, a single A level Maplet represents a 0.05×0.05 degree grid area; a single B level Maplet represents a 0.5×0.5 degree grid area; a single C level Maplet represents a 5×5 degree grid area; a single D level Maplet represents a 50×50 degree grid area and a single E level Maplet represents the entire world in a single Maplet. It is understood that Table A is only an example of a particular Maplet grid configuration; other or different grid configurations may also be developed. A Maplet comprises of a set of layers, with each layer containing a set of DEntries, and each DEentry containing a set of points.

TABLE A

| Level | Grid (degrees) | # of Maplets to cover the World | # of Maplets to cover North America | # of Maplets to cover Europe |
|---|---|---|---|---|
| A | 0.05 × 0.05 | 25,920,000 | 356,000 | 100,000 |
| B | 0.5 × 0.5 | 259,200 | 6,500 | 1000 |
| C | 5 × 5 | 2,592 | 96 | 10 |
| D | 50 × 50 | 32 | 5 | 5 |
| E | World | 1 | 1 | 1 |

Figure 3B:
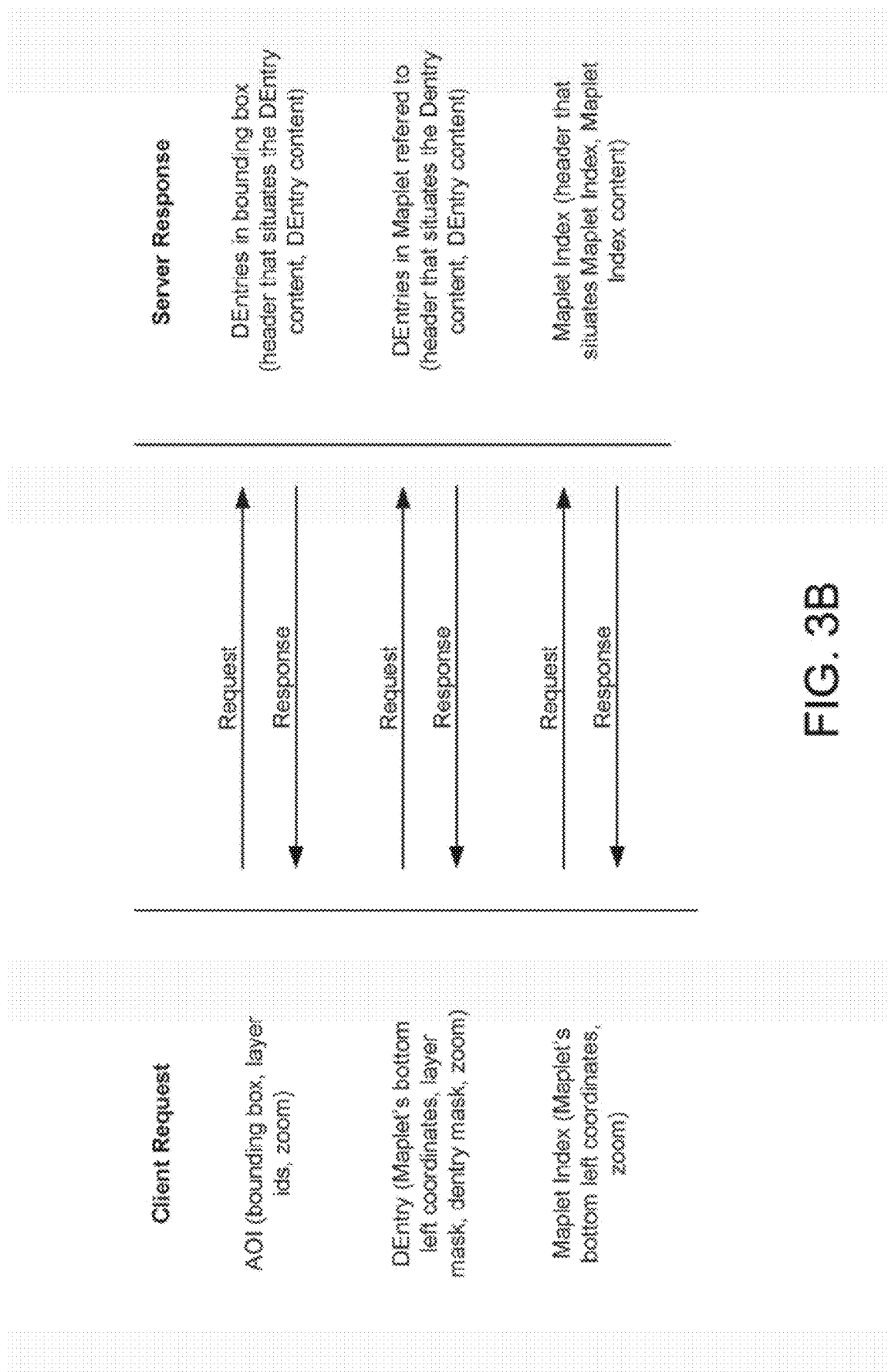
FIG. 3B illustrates a message exchange between a mobile communication device and a map server for downloading map content to the mobile communication device based on the system of FIG. 3A.

Turning now to FIG. 3B, three specific types of requests may be generated by a mobile communication device (i.e. the client)—AOI requests, DEntry requests, and Maplet Index requests. The requests may be generated separately or in various combinations, as discussed in greater detail below. An AOI (area of interest) request calls for all DEntries in a given area (bounding box) for a predetermined or selected set of z-order layers. The AOI request is usually generated when the mobile communication device moves to a new area so as to fetch Dentries for display before the device client knows what is available in the Maplet. The Maplet Index has the exact same structure as a Maplet but does not contain complete DEntries (i.e. the data Points that actually represent artifacts and labels are omitted). Thus, a Maplet Index defines what layers and DEntries are available for a given Maplet. A data or DEntry request is a mechanism to bundle together all of the required DEntries for a given Maplet.

Typically, AOI and Maplet Index requests are paired together in the same message, although they need not be, while DEntry requests are generated most often. For example, when the mobile communication device moves into an area in connection with which no information has been stored on the device client, the Maplet Index request returns a Maplet Index that indicates what data the client can specifically request from the server 321, while the AOI request returns any DEntries within the area of interest for the specified layers (if they exist). In the example requests shown in FIG. 3B, the desired Maplet is identified within a DEntry request by specifying the bottom-left Maplet coordinate. In addition, the DEntry request may include a layer mask so that unwanted Layers are not downloaded, a DEntry mask so that unwanted data Points are not downloaded, and zoom values to specify a zoom level for the requested DEntry. Once the device client has received the requested Maplet Index, the client typically then issues multiple DEntry requests to ask for specific DEntries (since the client knows all of the specific DEntries that are available based on the Maplet Index).

According to the present disclosure herein, a collection of 20×20 A-level Maplets (representing a 1×1 degree square) is compiled into a Maplet file (.mbl). An .mbl file contains a header which specifies the offset and length of each Maplet in the .mbl file. The same 20×20 collection of Maplet index data is compiled into a Maplet Index file (.mbx). The .mbl and .mbx file structures are set forth in Tables B and C, respectively.

TABLE B

| Address Offset | Offset | Length |
|---|---|---|
| 0x000 | Maplet # 0 Offset (4 bytes) | Maplet # 0 Length (4 bytes) |
| 0x008 | Maplet # 1 Offset | Maplet # 1 Length |
| 0x010 | Maplet # 2 Offset | Maplet # 2 Length |
| ... | ... | ... |

TABLE B-continued

| Address Offset | Offset | Length |
|---|---|---|
| 0xC78 | Maplet # 399 Offset | Maplet # 399 Length |
| 0xC80 | | Beginning of Maplet # 0 |
| 0xC80 + Size of Maplet # 0 | | Beginning of Maplet # 1 |
| 0xC80 + Size of Maplet # 0 + # 1 | | Beginning of Maplet # 2 |
| ... | | ... |
| 0xC80 + Σ of Size of Maplets (# 0: # 398) | | Beginning of Maplet # 399 |

In Table B, the offset of Maplet #0 is 0x0000_0000 since, according to the present disclosure, the data structure is based on the assumption that the base address for the actual Maplet data is 0x0000_0C80. Therefore the absolute address for Maplet #0 data is: Maplet #0 Address=Base Address (0x0000_0C80)+Maplet #0 Offset (0x0000_0000), and additional Maplet addresses are calculated as: Maplet # (n+1) Offset=Maplet # (n) Offset+Maplet #(n) Length. If a Maplet has no data or does not exist, the length parameter is set to zero (0x0000_0000).

TABLE C

| Address Offset | Offset (4 bytes) | Length (4 bytes) |
|---|---|---|
| 0x000 | Maplet Index # 0 Offset | Maplet Index # 0 Length |
| 0x008 | Maplet Index # 1 Offset | Maplet Index # 1 Length |
| 0x010 | Maplet Index # 2 Offset | Maplet Index # 2 Length |
| ... | ... | ... |
| 0xC78 | Maplet Index # 399 Offset | Maplet Index # 399 Length |
| 0xC80 | | Beginning of Maplet Index # 0 |
| 0xC80 + Size of Maplet Index # 0 | | Beginning of Maplet Index # 1 |
| 0xC80 + Size of Maplet Index # 0 + # 1 | | Beginning of Maplet Index # 2 |
| ... | | ... |
| 0xC80 + Σ of Size of Maplet Indices (# 0: # 399) | | Beginning of Maplet Index # 399 |

In Table C, the offset of Maplet Index #0 is 0x0000_0000 since, according to the present disclosure the data structure is based on the assumption that the base address for the actual Maplet index data is 0x0000_0C80. Therefore the absolute address for Maplet Index #0 data is: Maplet Index #0 Address=Base Address (0x0000_0C80)+Maplet Index #0 Offset (0x0000_0000), and additional Maplet index addresses are calculated as: Maplet Index # (n+1) Offset=Maplet Index # (n) Offset+Maplet Index #(n) Length. If a Maplet Index has no data or does not exist, the length parameter is set to zero (0x0000_0000).

Figure 3C:
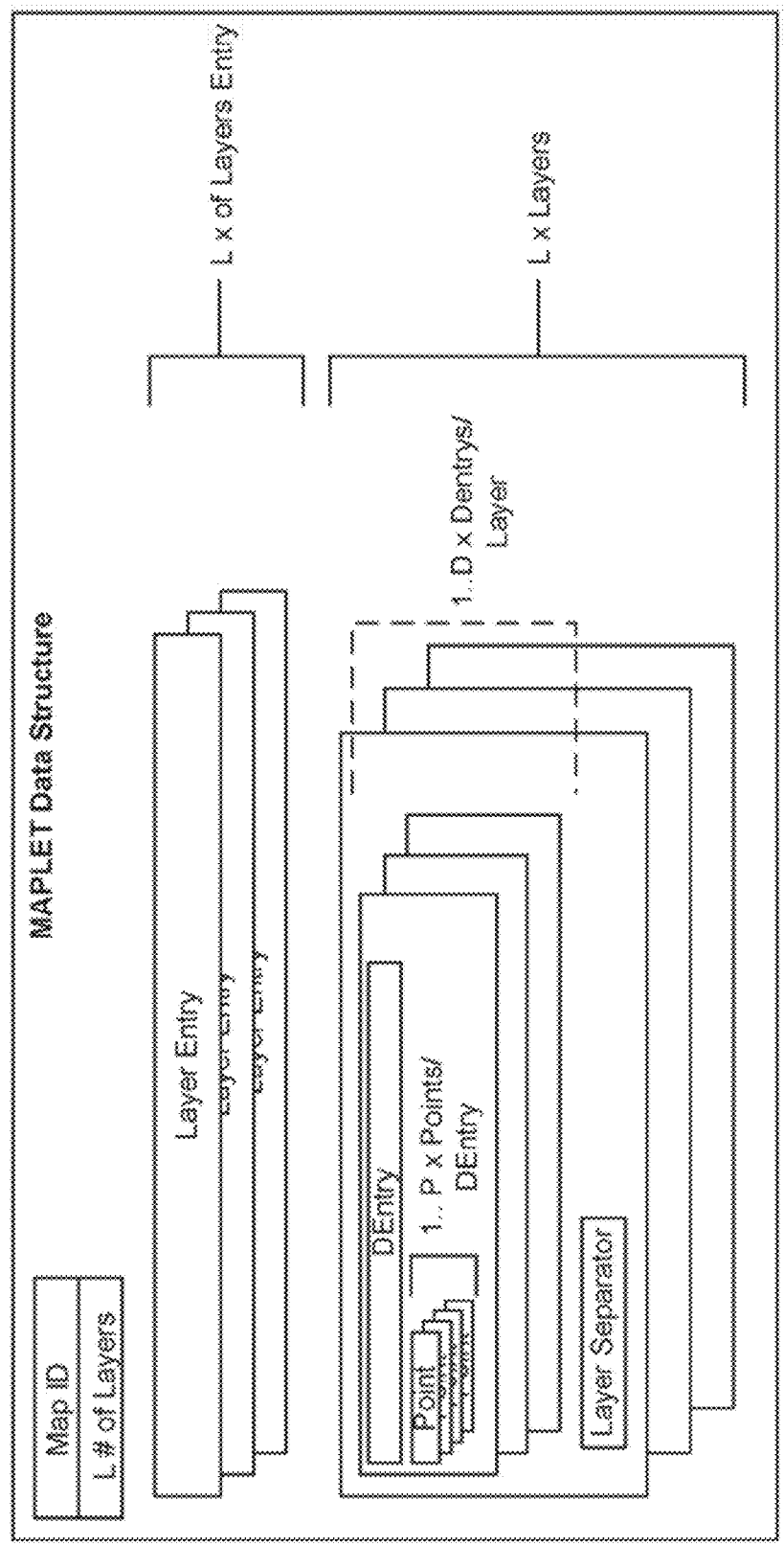
FIG. 3C is a diagram showing a Maplet data structure according to an exemplary embodiment.

FIG. 3C and Table D below, in combination, illustrate an exemplary embodiment of a basic Maplet data structure. Generally, as noted above, the Maplet data structure can be said to include a Maplet Index (ie an index of the DEntries, each of which representative of either an artifact or a label or both) together with data Points for each DEntry that actually form such artifacts and labels. In this example, each Maplet includes a Map ID (e.g. 0xA1B1C1D1), the # of Layers in the Maplet, and a Layer Entry for each Layer. The Map ID identifies the data as a valid Maplet, and according to one alternative, may also be used to identify a version number for the data. The # of Layers is an integer which indicates the number of Layers (and therefore Layer Entries)

in the Maplet. Each Layer Entry defines rendering attributes for all DEntries in the corresponding Layer and is followed by a list of DEntries for that Layer. The above forms a Maplet Index. For a complete Maplet, each DEntry contains a set of data Points (referred to herein as oPoints) or Labels). Note that Layers may have multiple DEntries and the complete list of DEntrys and Points are grouped by Layer and separated by a Layer Separator (e.g. hex value 0xEEEEEEEE). According to an exemplary embodiment, each Layer Entry is 20 bytes long, and a DEntry is 12 bytes long. However, the number of Layers, number of DEntries per Layer and the number of Points per DEntry depends on the map data and is variable.

Table D provides a high "byte-level" description of a Maplet.

TABLE D

| Data | | Quantity | Total # of Bytes |
| --- | --- | --- | --- |
| Map ID | | 1 | 4 bytes |
| # of Layers | | 1 | 4 bytes |
| Layer Entrys | | # of Layers | 20 bytes × (# of Layers) |
| DEntry of a Layer | x (# of DEntries in a Layer) | # of Layers | 12 bytes × (Σ of the # of DEntrys in each Layer) + |
| Points for DEntry of a Layer | | | 4 bytes × (Σ of the # of Points in each DEntry in each Layer) + |
| Layer Separator | | | 4 bytes × (# of Layers) |

For even greater detail if desired, this application hereby incorporates by reference herein a U.S. provisional patent application entitled "Method And System For Distribution Of Map Content To Mobile Communication Devices" having Ser. No. 60/787,541, lead inventor Eric Johnson, and a filing date of 31 Mar. 2006.

Figure 4:
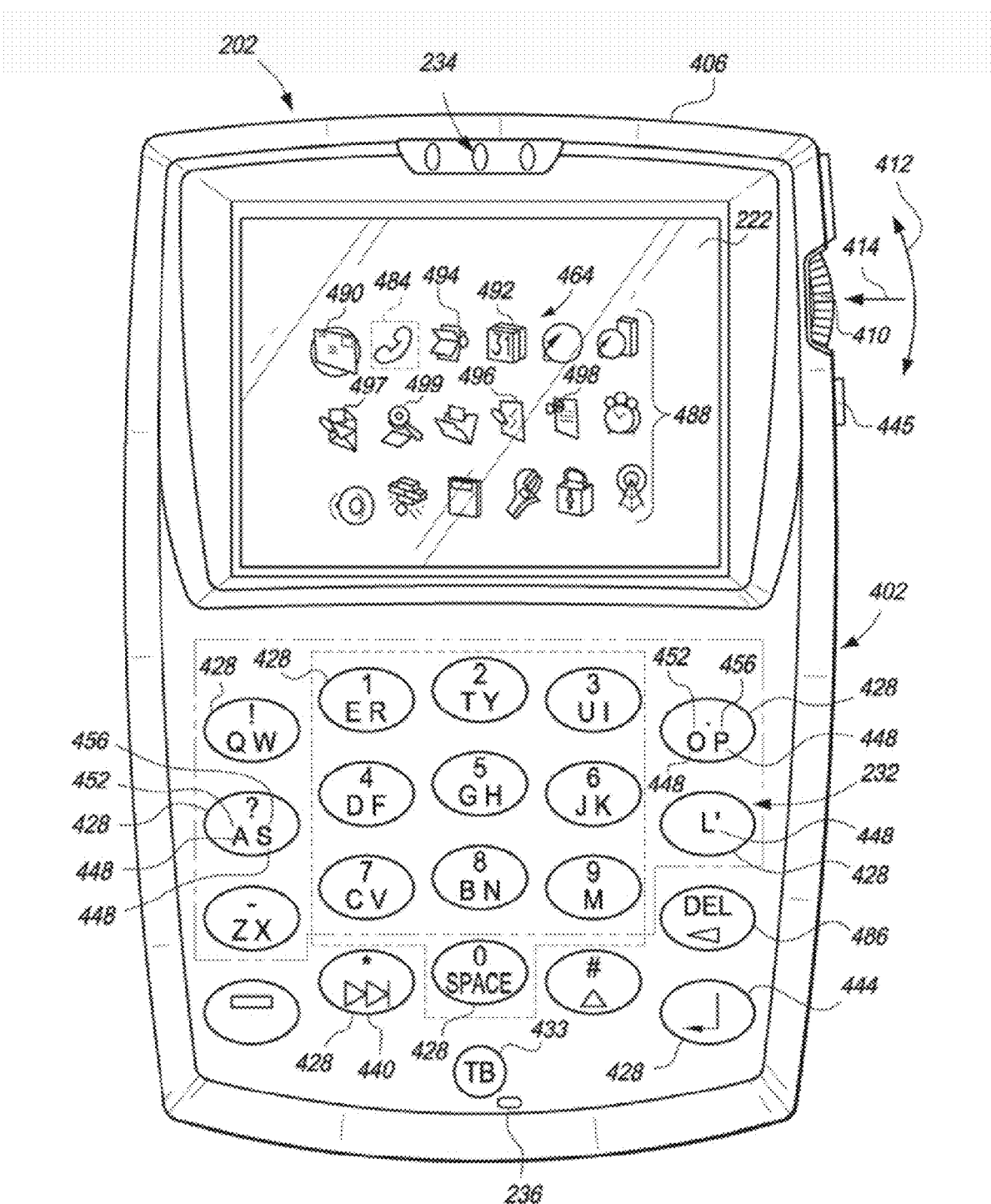
FIG. 4 is an illustration of a user interface of the mobile communication device.

FIG. 4 is an example of a user interface 402 of mobile station 202 which includes at least display 222, keyboard 232, speaker 234, microphone 236, and a cursor or view positioning mechanism such as a positioning wheel 410 (e.g. a scrollwheel wheel) or a trackball 433. Although shown enlarged in FIG. 4 for clarity, this mobile station 202 is sized to be a handheld portable device. As an alternative to or in addition to positioning wheel 410 and/or trackball 433, a wide range of one or more pointing or cursor/view positioning mechanisms such as a touch pad a joystick button, a mouse, a touchscreen, a tablet, or other whether presently known or unknown, may be employed. As employed herein, the term "cursor" shall expressly include, but not be limited by, a pointer, a movable item or other visual cue (e.g., without limitation, a graphical object; a special symbol; an outline; a rectangle; an underline character; a blinking item) used to mark a position or point to another item on a display, in order to, for example, indicate position for data entry or for selection of the other item.

Keys 428 of keyboard 232 are disposed on a front face of a housing 406 and positioning wheel 410 is disposed at a side of housing 406. Keyboard 232 is in the example form of a reduced QWERTY keyboard including a plurality of keys 428 that serve as input members. It can be seen that the arrangement of the characters 448 on keys 428 of keyboard 424 is generally of the QWERTY arrangement, albeit with many of keys 428 including two of characters 448. In the example depiction of keyboard 424, many of keys 428 include two characters, such as including a first character 452 and a second character 456 assigned thereto. It is understood that the expression "characters" shall broadly be construed to include letters, digits, symbols and the like and can additionally include ideographic characters, components thereof, and the like. One of keys 428 of keyboard 424 includes as the characters 448 thereof the letters "Q" and "W", and an adjacent key 428 includes as the characters 448 thereof the letters "E" and "R". Keyboard 424 may be of other configurations, such as an AZERTY keyboard, a QWERTZ keyboard, a Dvorak keyboard, or other keyboard or keypad arrangement, whether presently known or unknown, and either reduced or not reduced (i.e. full). In a "full" or non-reduced keyboard or keypad arrangement, each key has a single letter (not multiple letters) of the alphabet assigned to it.

Among keys 428 of keyboard 232 are a <NEXT> key 440 and an <ENTER> key 444. The <NEXT> key 440, wherein, for example, "<NEXT>" may be a symbol or may be the word "next" provided (e.g. printed) on the key, may be pressed to provide a selection input to the processor and provides substantially the same selection input as is provided by a rotational input of positioning wheel 410. Since <NEXT> key 440 is provided adjacent a number of other keys 428 of keyboard 232, the user can provide a selection input to the processor substantially without moving the user's hands away from the keyboard 232 during a text entry operation. Another key, the <ESC> key 445 is disposed on the side of housing 406 adjacent positioning wheel 438, although the same or similar key may be disposed as part of keyboard 232. Among keys 428 of the keyboard 424 additionally is a <DEL> key 486 that can be provided to delete a text entry.

Positioning wheel 410 may serve as another input member and is both rotatable, as is indicated by an arrow 412, to provide selection inputs to the processor, and also can be pressed in a direction generally toward housing 406, as is indicated by an arrow 414 to provide another selection input to the processor. Positioning wheel 410 will be described in more detail in relation to FIGS. 6 and 7 below.

Display 222 may include a cursor 484 that depicts generally where the next input or selection from user interface 402 will be received. Display 222 is shown in FIG. 4 as displaying a home screen that represents a number of applications 586 (see also FIG. 5 which shows some of the example possible applications 86) depicted as corresponding discrete icons 488. Icons 488 include, for example, an Electronic Mail (E-Mail) icon 490, a Calendar icon 492, an Address Book icon 494, a Tasks icon 496, a Messages icon 497, a MemoPad icon 498, and a Search icon 499, respectively.

Figure 5:
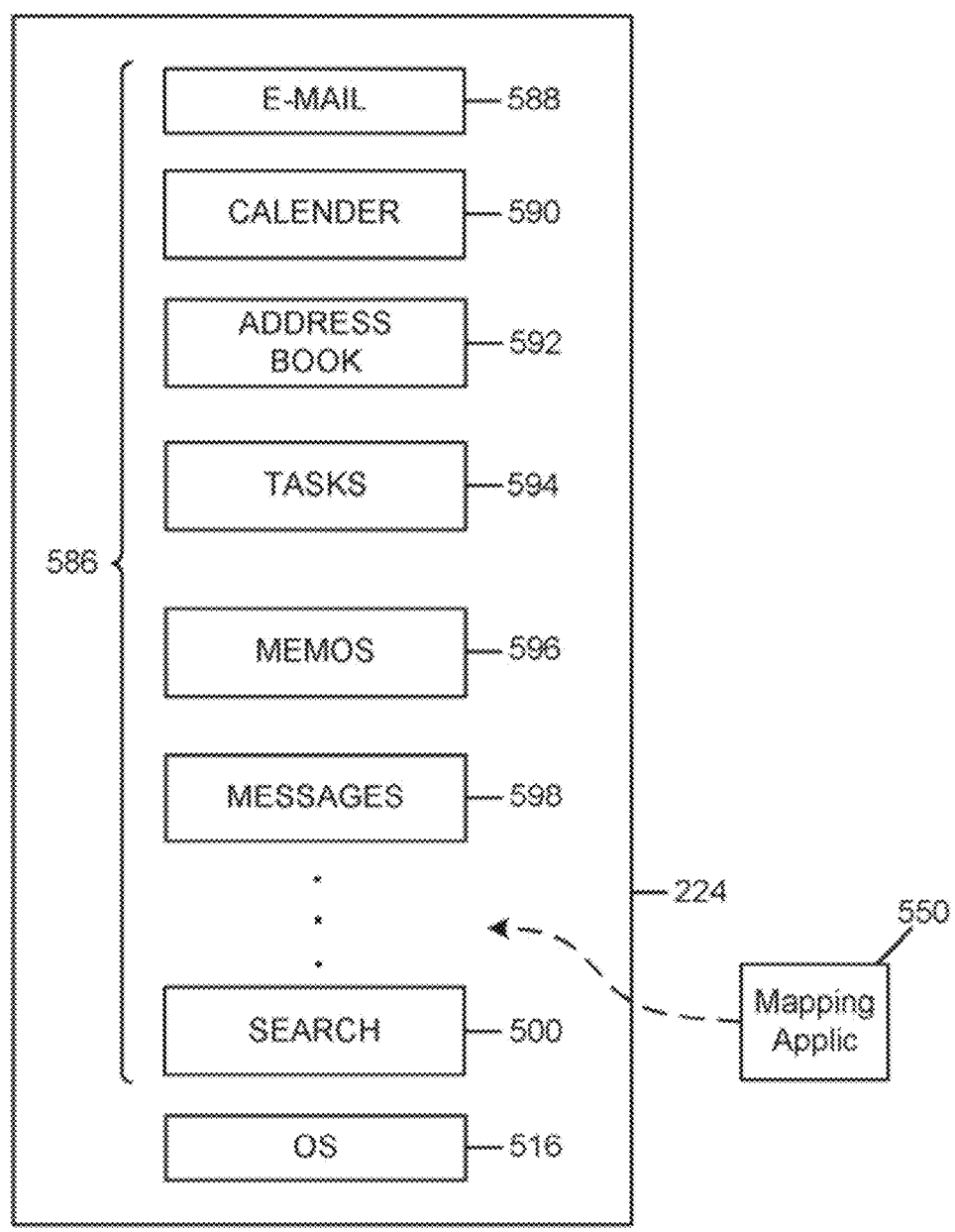
FIG. 5 is an illustration of various software applications which may reside in the mobile communication device.

As shown in FIG. 5, memory 224 includes a plurality of applications or routines 586 associated with the visually displayed icons 488 of FIG. 4 for the processing of data. Applications 586 may be in any of a variety of forms such as, without limitation, software, firmware, and the like. Applications 586 include, for example, an Electronic Mail (E-Mail) application 588 (FIG. 5) associated with E-mail icon 490 (FIG. 4), a Calendar application 590 (FIG. 5) associated with Calendar icon 492 (FIG. 4), an Address Book application 592 (FIG. 5) associated with Address Book icon 494 (FIG. 4), a Tasks application 594 (FIG. 5) associated with Tasks icon 496 (FIG. 4), a MemoPad (Memos) application 596 (FIG. 5) associated with MemoPad icon 498, a Messages application 598 (FIG. 5) associated with Message icon 497 (FIG. 4), and a Search application 500 (FIG. 5) associated with Search icon 499 (FIG. 4). An operating system (OS) program 516 also resides in memory 224. The mobile station of the present disclosure is also adapted to render visual maps in its visual display, and utilizes a mapping application 550 stored in memory 224 to facilitate map rendering and related functionality.

In FIG. 4, the "home" screen output is currently active and constitutes the main "ribbon" application for displaying the icons 488 shown. An application, such as E-mail application 588 of FIG. 5, may then be initiated (opened or viewed) from user interface 402 by providing a suitable user input to it. For example, E-mail application 588 may be initiated (opened or viewed) by rotating positioning wheel 410 to highlight E-mail icon 490 and providing a selection input by translating positioning wheel 410 in the direction indicated by arrow 438. As another example, display 222 displays icon 499 associated with Search application 500 and accepts input from positioning wheel 410 to initiate a search from that icon 499. Applications 586 may be additionally or alternatively initiated (opened or viewed) from user interface 402 by providing another suitable input to it, such as by suitably rotating or "rolling" trackball 433 and providing a selection input by, for example, pushing the trackball 33 (e.g. somewhat similar to positioning wheel 410 except into the plane of FIG. 4).

Movement, navigation, and/or scrolling with use of a cursor/view positioning mechanism is beneficial given the relatively large size of visually displayed information and the compact size of display 222, and since information and messages are typically only partially presented in the limited view of display 222 at any given moment. As previously described, positioning wheel 410 is one helpful cursor/view positioning mechanism to achieve such movement. Positioning wheel 312, which may be referred to as a scrollwheel, specifically includes a circular disc which is rotatable about a fixed axis of housing 302 and may be rotated by the end user's index finger or thumb. When the information or message is being partially displayed, an upwards rotation of positioning wheel 410 causes an upwards scrolling such that display 222 presents viewing of an upper portion of the information or message. Similarly, a downwards rotation of positioning wheel 410 causes a downwards scrolling such that display 222 presents viewing of a lower portion of the information or message. Positioning wheel 410 is mounted along a fixed linear axis such that the end user can depress positioning wheel 410 inwards toward housing 406 (e.g. with the end user's index finger or thumb) for selection of information. Again, see the direction indicated by an arrow 414 of positioning wheel 410 shown.

Figure 6:
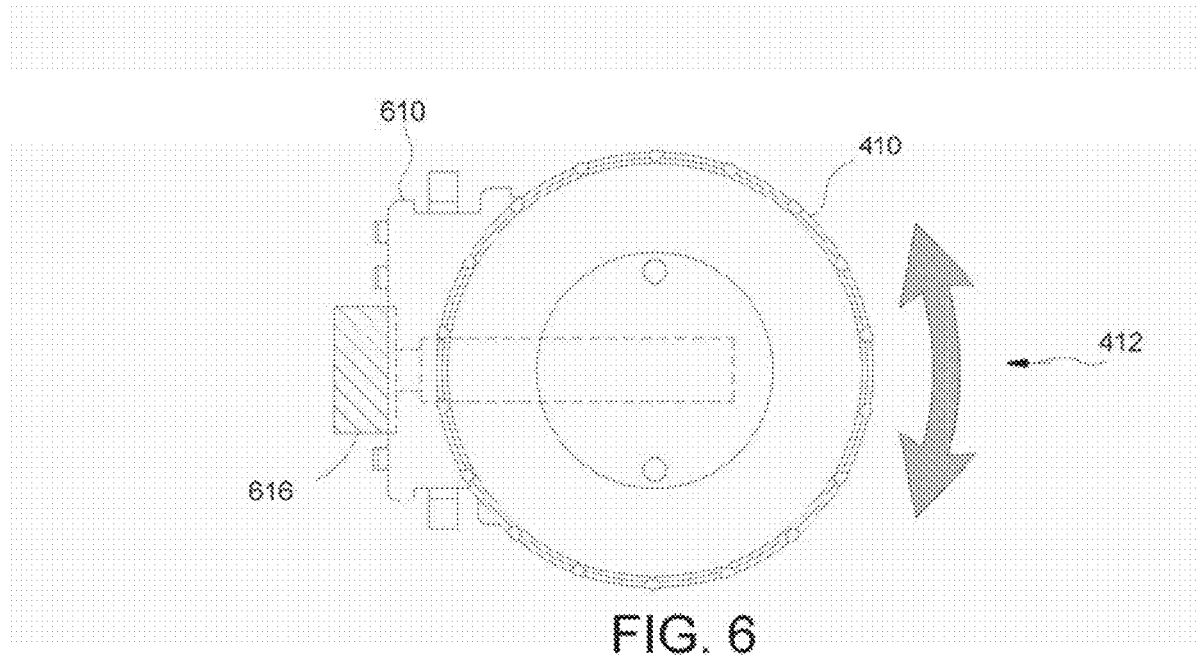
FIGS. 6 and 7 are illustrations of a positioning wheel (one type of positioning mechanism) of the mobile communication device.
Figure 7:
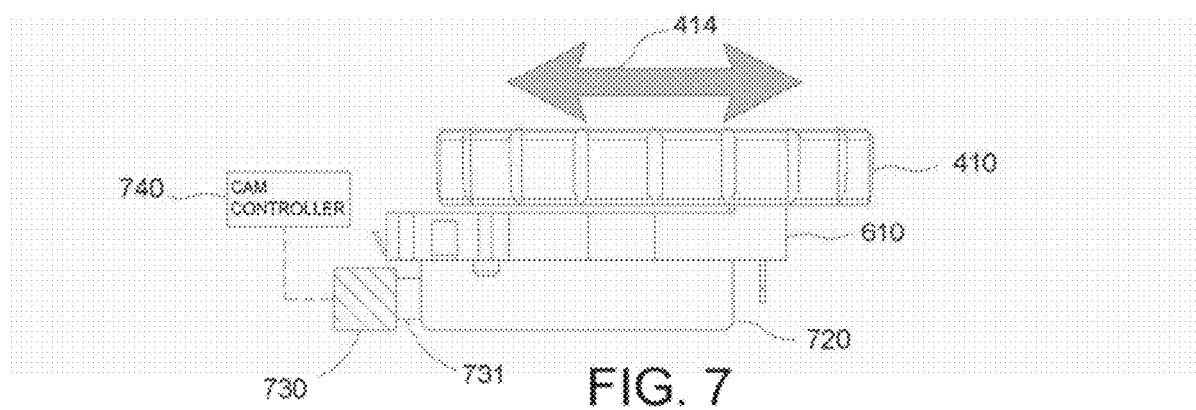

A more detailed mechanism for positioning wheel 410 is now described in relation to FIGS. 6 and 7. Positioning wheel 410 of FIGS. 6-7 is shown connected to and rotatable about a body assembly 610. Body assembly 610 may be connected to or be part of a slide assembly 720. Slide assembly 720 allows the entirety of positioning wheel 410 and body assembly 610 may move freely laterally 414 with respect to the handheld device. Lateral positioning wheel movement 414 is defined as movement along a plane normal to the rotational axis of positioning wheel 410. To control this lateral movement 414, slide assembly 720 may be connected to a control mechanism such as a cam mechanism 730 with a cam 731, or alternatively a level mechanism, a solenoid mechanism, or some other actuating means. Cam mechanism 730 is connected to a cam controller 740 responsible for controlling a lateral position of positioning wheel 410. As cam 731 connected to cam mechanism 730 and slide assembly 720 moves, positioning wheel 410 and body assembly 610 accordingly move laterally. Such lateral movement inwards toward the housing is detectable by the processor of the mobile station as a switch input (actuation or depression of the positioning wheel key).

Although positioning wheel 410 has been shown and described as one mechanism for use in navigating and moving through visually displayed information, any suitable mechanism may be utilized for the present user interface techniques, such a trackball; UP, DOWN, LEFT, and RIGHT keys; a mouse and cursor mechanism; or a touch screen display mechanism.

Figure 8:
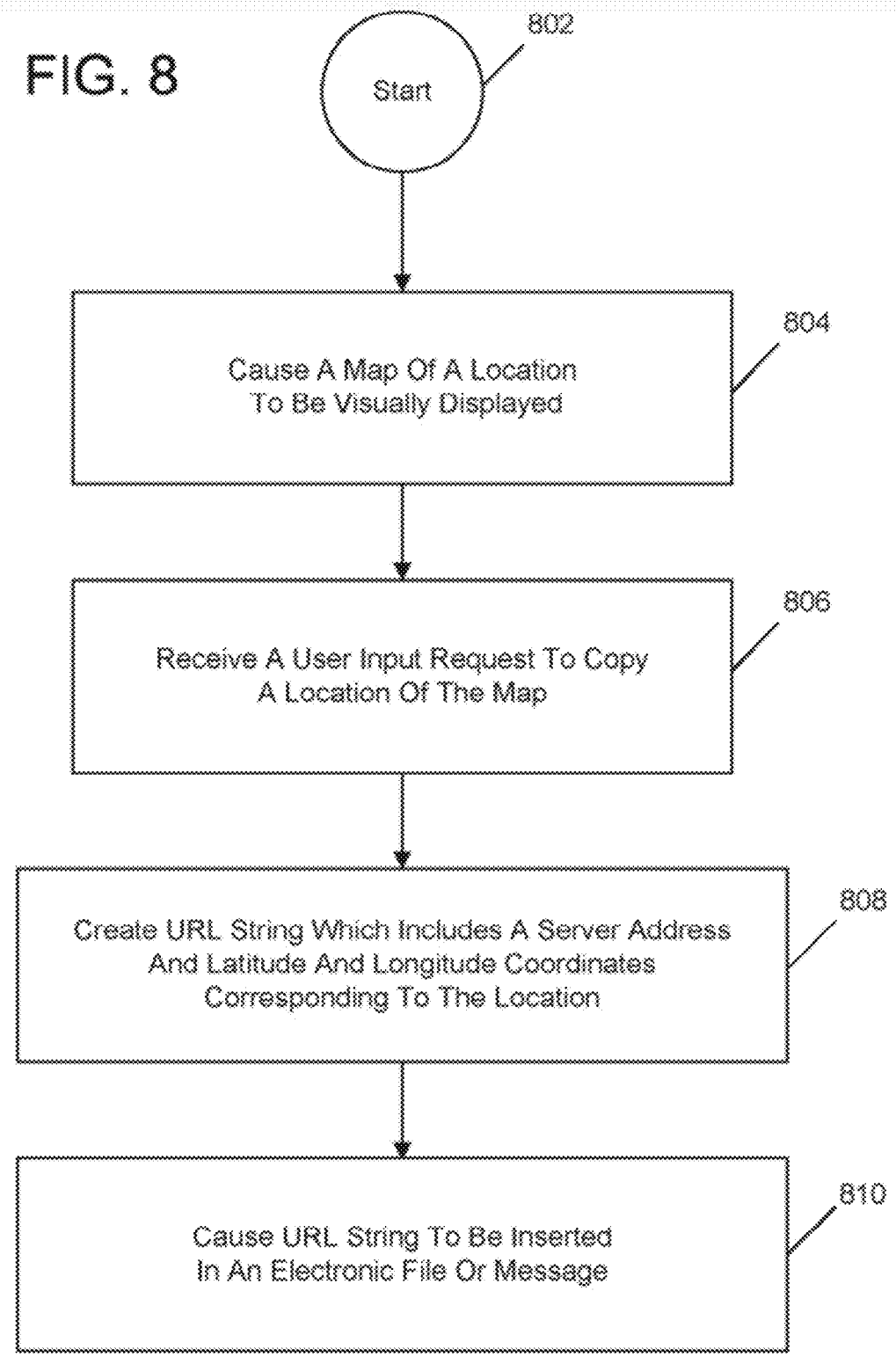
FIG. 8 is a flowchart which helps describe a method of providing a map location in a user application using a Uniform Resource Location (URL) string.

FIG. 8 is a flowchart which helps describe a method of providing a map location in a user application using a Uniform Resource Location (URL) string. The method may be performed by a mobile station as described in relation to the previous figures, or by any other computer or communication device (e.g. a PC). The steps of the method may be performed by one or more processors of the device. A computer program product for the mobile station may include computer instructions stored on a computer readable medium (memory, a floppy disk or CD-ROM) which are written in accordance with the described logic of this method.

Beginning at a start block 802 of FIG. 8, the processor causes a map to be visually displayed in a display (step 804 of FIG. 8). Next, a user input request to copy a location of the map is received through the user interface (step 806 of FIG. 8). In response to the user input request, the processor produces a URL string corresponding to the location of the map (step 808 of FIG. 8). The URL string includes a server address and latitude and longitude coordinates corresponding to the location of the map. Another parameter, such as a zoom parameter or a reference coordinate or sizing parameter, may also be provided, although such information may be implied or set by default as an alternative. The server address is an address to a server (preferably a public domain server) which is operative to provide map data in response to a request for the map data using the URL string. Specifically, the URL string may have the following predetermined format for all such requests:
http://<server address> lat=<latitude coordinate>& lon=<longitude coordinate>& z=<zoom parameter>
Subsequently, the processor causes the URL string to be inserted in the electronic file or message (step 810 of FIG. 8), preferably for communications to another communication device. The electronic file or message may be an e-mail file or message, a calendar file or message, a task file or message, or a map file or message, as examples. Steps 808 and 810 may be triggered and performed automatically by the processor in response to the request in step 806 without further user intervention. Alternatively, step 806 may be a first user input request to invoke a COPY function and step 810 performed in response to receiving a second user input request to invoke a PASTE function.

Figure 9:
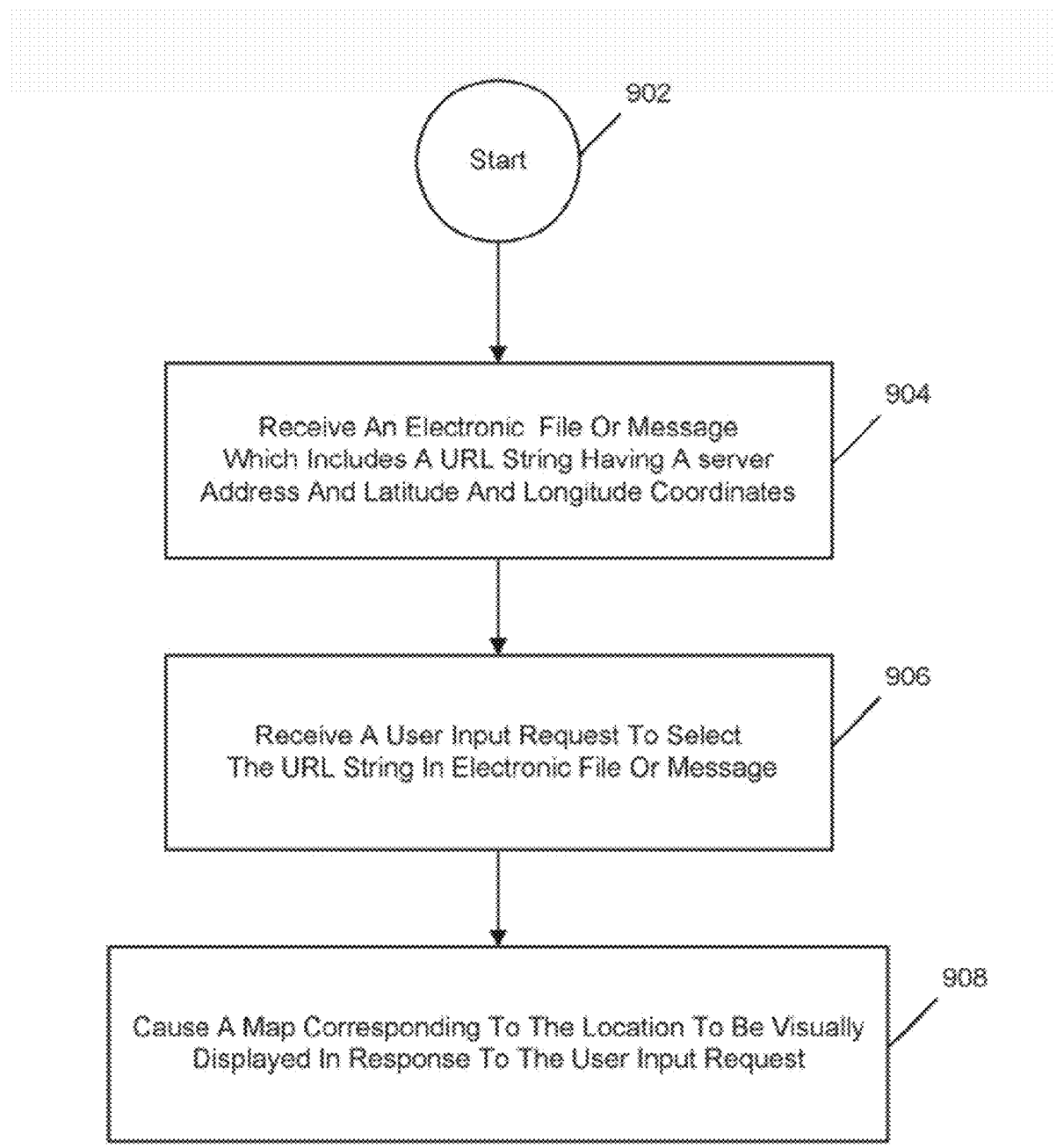
FIG. 9 is a flowchart which helps describe a method of utilizing the map location in the user application using the URL string.

FIG. 9 is a flowchart which helps describe a method of utilizing the map location in the user application using the URL string. The method may be performed by a mobile station as described in relation to the previous figures, or by any other computer or communication device (e.g. a PC). The steps of the method may be performed by one or more processors of the device. A computer program product for the mobile station may include computer instructions stored on a computer readable medium (memory, a floppy disk or CD-ROM) which are written in accordance with the described logic of this method.

Beginning with a start block of step 902, an electronic file or message which includes a uniform resource locator (URL) string is received by the processor (step 904 of FIG. 9). The electronic file or message may be an e-mail file or message, a calendar file or message, a task file or message, or a map file or message, as examples. The URL string includes a server address and latitude and longitude coordinates corresponding to the location of the map. Another parameter, such as a zoom parameter or a reference coordinate or sizing parameter, may also be provided, although such information may be implied or set by default as an alternative. The server address is an address to a server (preferably a public domain server) which is operative to provide map data in response to a request for the map data using the URL string. Specifically, again, the URL string may have the following format for all such location rendering:

http://<server address>? lat=<latitude coordinate>& lon=<longitude coordinate>& z=<zoom parameter>

Next, a user input request to select the URL string in the electronic file or message is received via the user interface from the end user (step 906 of FIG. 9).

In response to the user input request in step 906, the processor causes a map of a location corresponding to the latitude and longitude coordinates to be visually displayed in the display (step 908 of FIG. 9). Step 908 is preferably triggered and performed automatically by the processor in response to the request in step 906 without further user intervention. As will be described later below in relation to FIG. 44, processing of the received URL string may be handled differently depending on the type of device or whether a predetermined mapping application is installed in the device, so that mapping functionality is provided in different environments.

In one scenario of step 908, when the device has the mapping application installed, the processor may first identify whether map data corresponding to the map of the location is available in its memory cache from a previous rendering of the map. If the map data is available in its cache, the processor selects this cached map data to render the map of the location. If the map data is not available in the cache, however, the processor must retrieve the map data from an external source. In this case, the user input request causes the processor to act on the URL string by sending a request message for the map data to the server at the server address. The request message includes the latitude and longitude coordinates (and any other information) to the server as input parameters. A source address of the communication device is also received at the server along with the request. In response, the server operates to receive and process the request to retrieve map data for the rendering of the map at the location corresponding to the latitude and longitude coordinates. The server then operates to respond to the request of the communication device by sending a response message which includes the map data to the communication device at its address. The processor of the communication device receives the map data and causes the map of the location to be visually displayed in the display.

Specific examples of the techniques of FIGS. 8 and 9 are now illustrated with reference to FIGS. 10-43, for providing and utilizing map locations in user applications with use of the URL strings.

Figure 10:
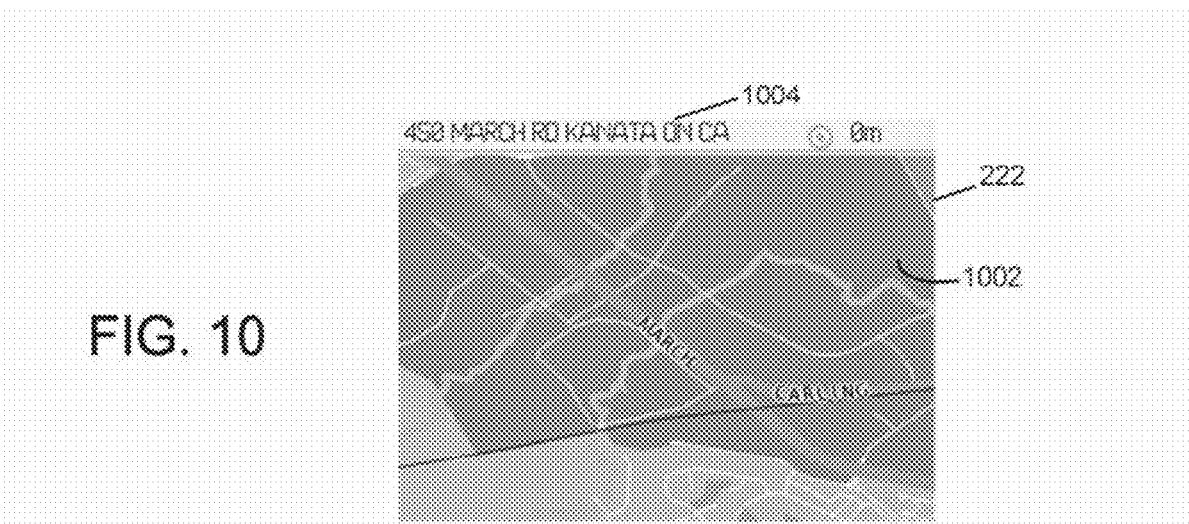
FIGS. 10-14 are sequential views of a display of the mobile communication device to further illustrate the method of FIG. 8 in connection with an e-mail application.
Figure 11:
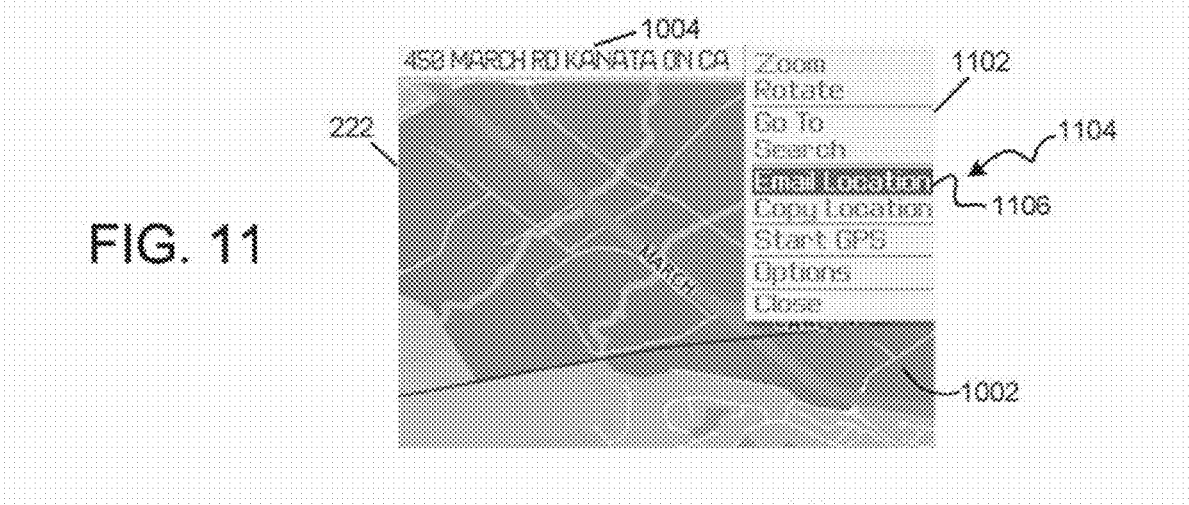
Figure 12:
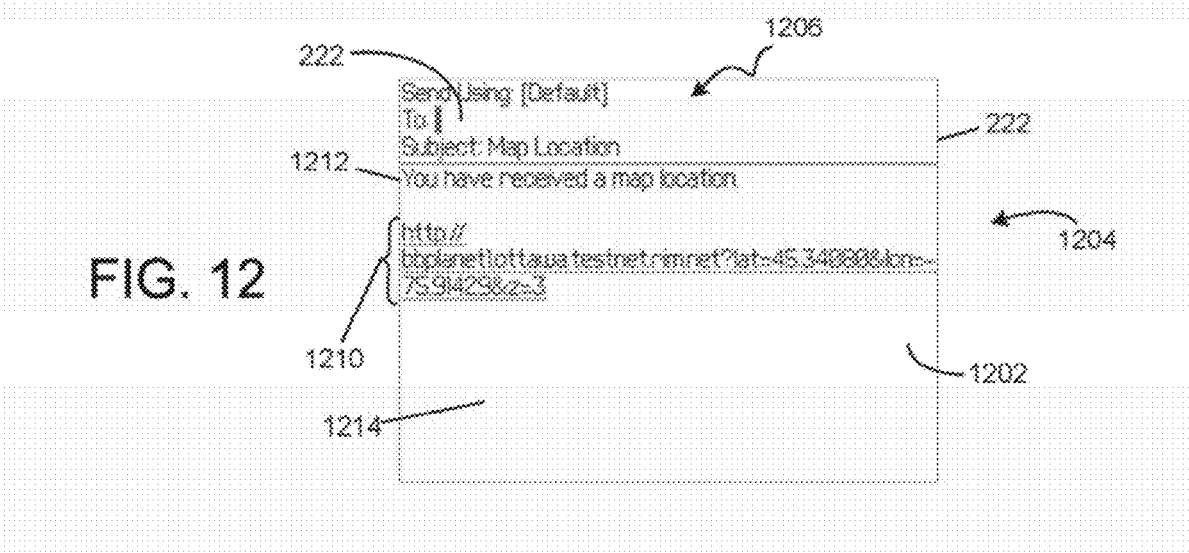
Figure 13:
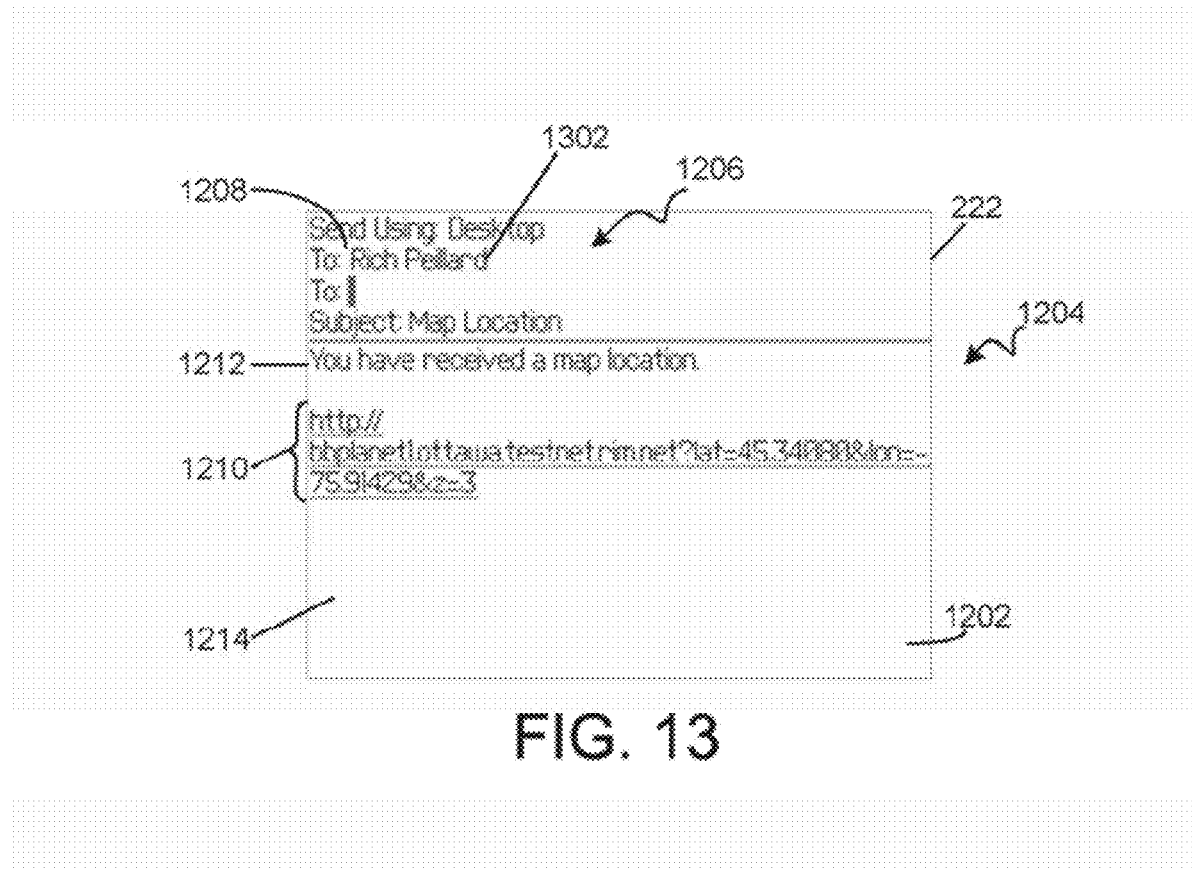
Figure 14:
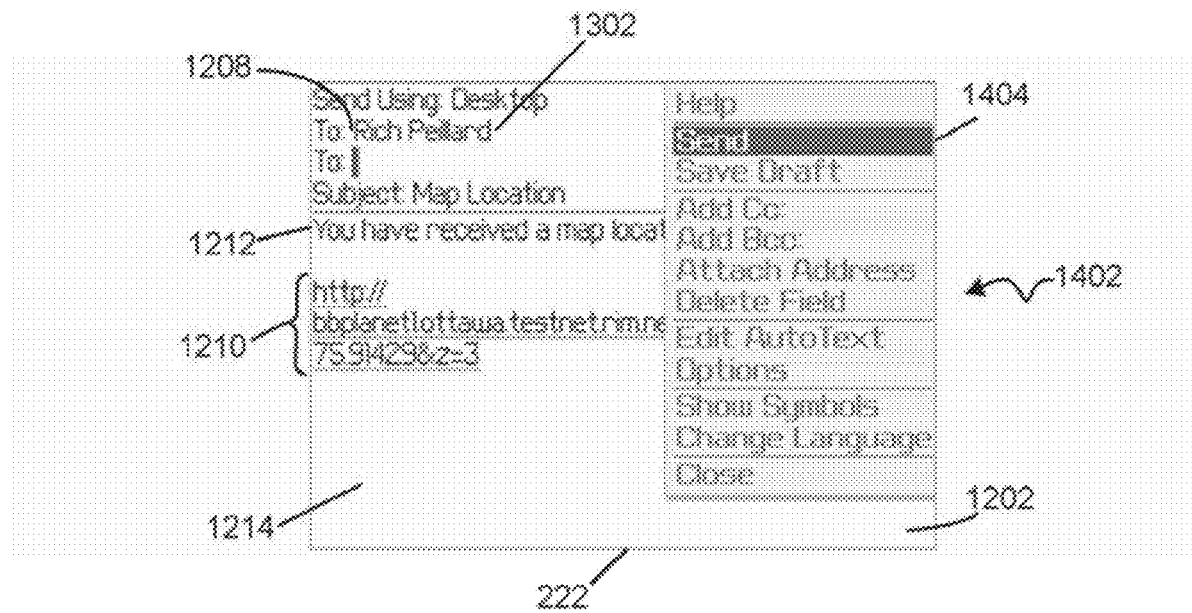

FIGS. 10-14 are sequential views of display 222 to further illustrate the method of FIG. 8 in connection with an e-mail application (e.g. E-mail application 588 of FIG. 5). In FIG. 10, it is shown that a map 1002 of a location at an indicated address 1004 of "450 March Road, Kanata, Ontario, Canada" is visually displayed in display 222. In response to a depression or actuation of a positioning mechanism (e.g. positioning wheel 410 of FIGS. 4, 6, and 7) by the end user during the display of map 1002, in FIG. 11 it is shown that a pop-up or pull-down list or menu 1102 having a plurality of function identifiers 1104 is displayed over a portion of map 1002. The end user may subsequently rotate the positioning mechanism to scroll a cursor up/down through function identifiers 1104 of menu 1102 for highlighting the same one at a time. In FIG. 11, it is shown that the cursor is positioned so as to highlight an "E-mail Location" function 1106 in menu 1102. In response to a depression or actuation of the positioning mechanism by the end user while E-mail Location function 1106 is highlighted, in FIG. 12 it is shown that the processor causes a new e-mail message 1204 to be created from the e-mail application and displayed in display 222. New e-mail message 1202 is automatically populated with information in an e-mail message body 1202 of new e-mail message 1204. As shown, e-mail message body 1202 includes a map location indicia 1212 ("You have received a map location") which prefaces a location URL string 1210 of the type previously described in relation to FIG. 8. Location URL string 1210 corresponds to the location of map 1002 displayed in FIGS. 10 and 11, and reads as http://bbplanet1.ottawa.testnet.rim.net?lat=45.34080&lon=-75.91429&z=3". Message body space 1214 remains in e-mail message body 1202 for the end user to input additional text for the new e-mail message 1202. Other e-mail message fields 1206, such as an e-mail "TO" field 1208, are left blank for the end user to input text, whereas other e-mail message fields, such as an e-mail "SUBJECT" field, may be pre-populated. In FIG. 13, it is shown that the end user has used the input keys of the device to input a recipient e-mail address 1302 (for address book contact="Richard Peillard") into the TO field 1208. In response to a depression or actuation of the positioning mechanism by the end user during the display of new e-mail message 1204, in FIG. 14 it is shown that a pop-up or pull-down list or menu 1402 having a plurality of function identifiers is displayed over a portion the new e-mail message. The end user may subsequently rotate the positioning mechanism to scroll the cursor up/down through the function identifiers of menu 1402 for highlighting the same one at a time. In FIG. 14, it is shown that the cursor is positioned so as to highlight a "Send" function identifier 1404 in menu 1402. In response to a depression or actuation of the positioning mechanism by the end user while Send function identifier 1404 is highlighted, in FIG. 12 the processor causes new e-mail message 1204 to be sent or communicated to the recipient e-mail address.

Figure 15:
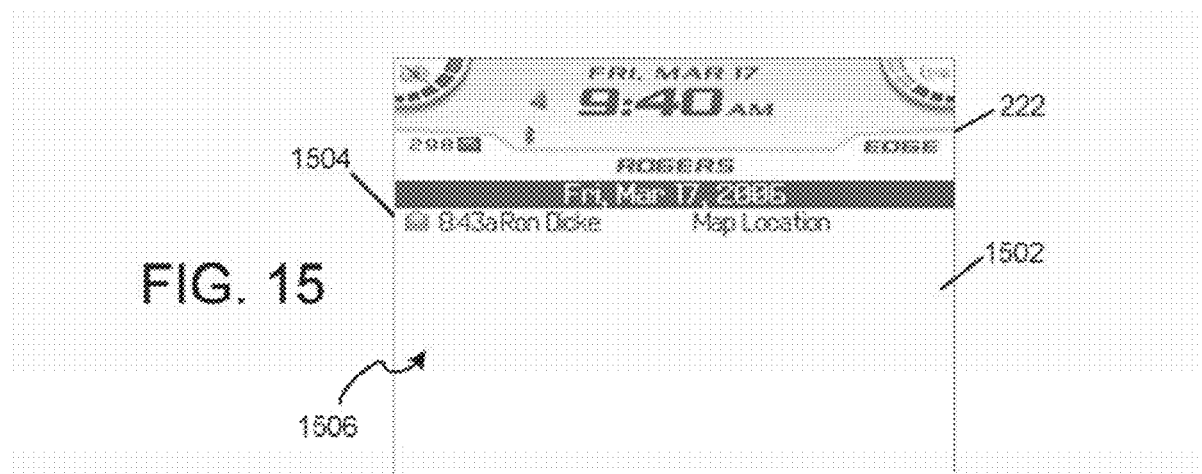
FIGS. 15-20 are sequential views of the display to further illustrate the method of FIG. 9 in connection with an e-mail application.
Figure 16:
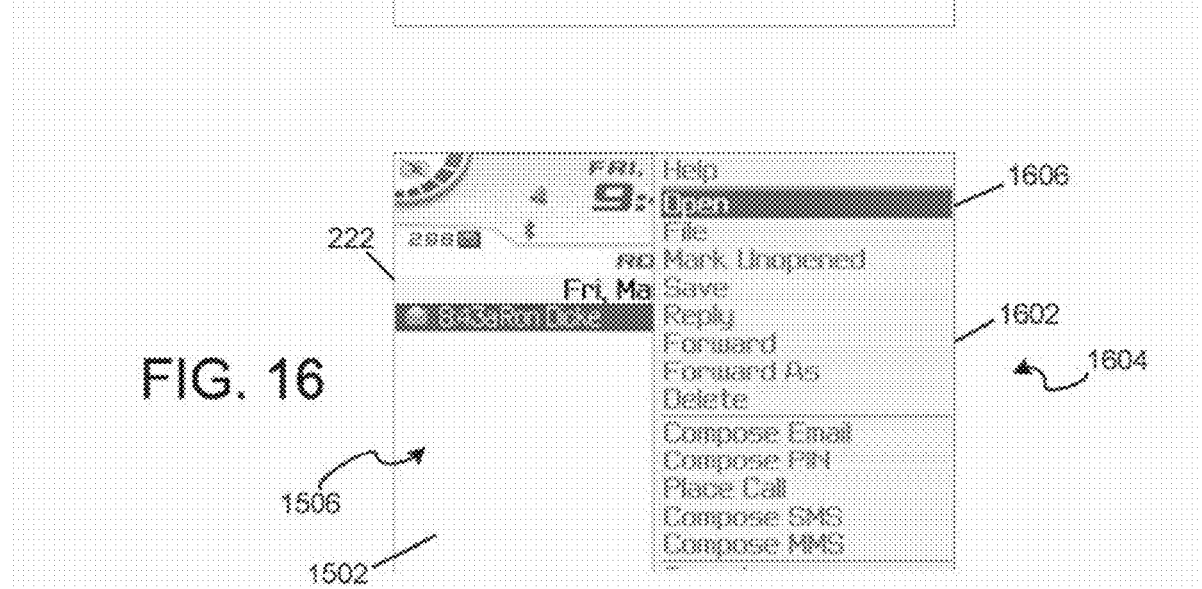
Figure 17:
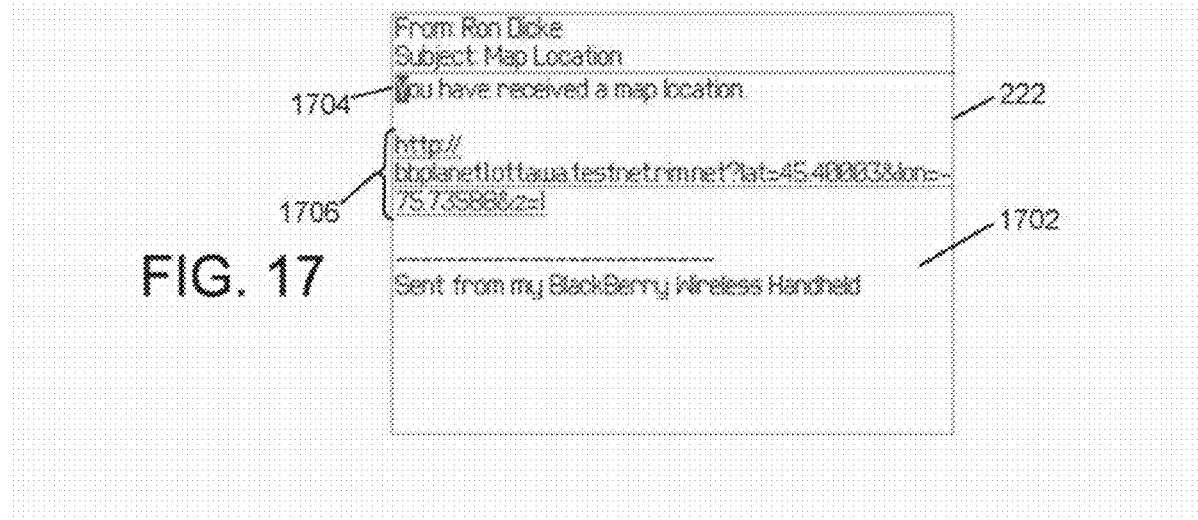
Figure 18:
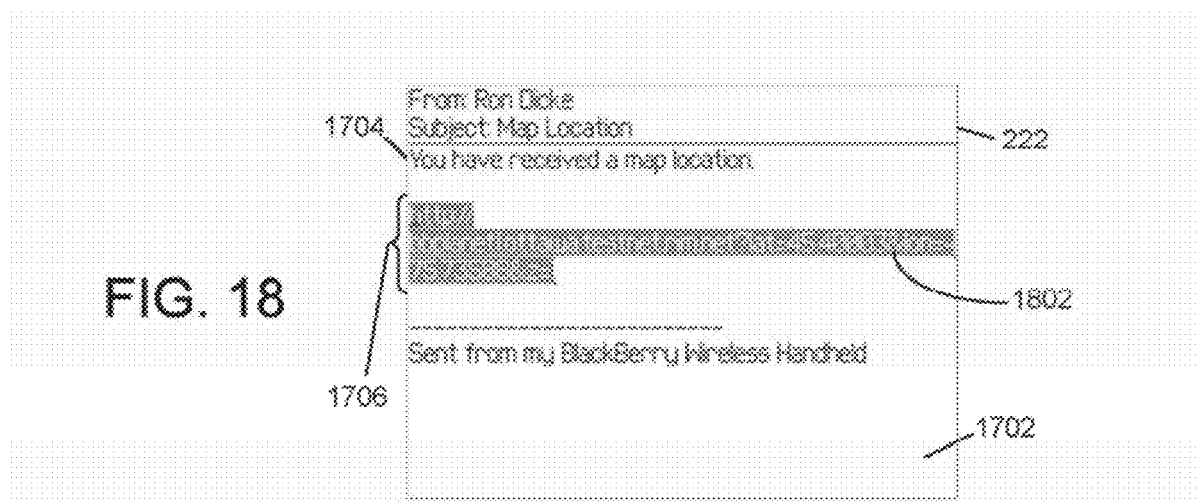
Figure 19:
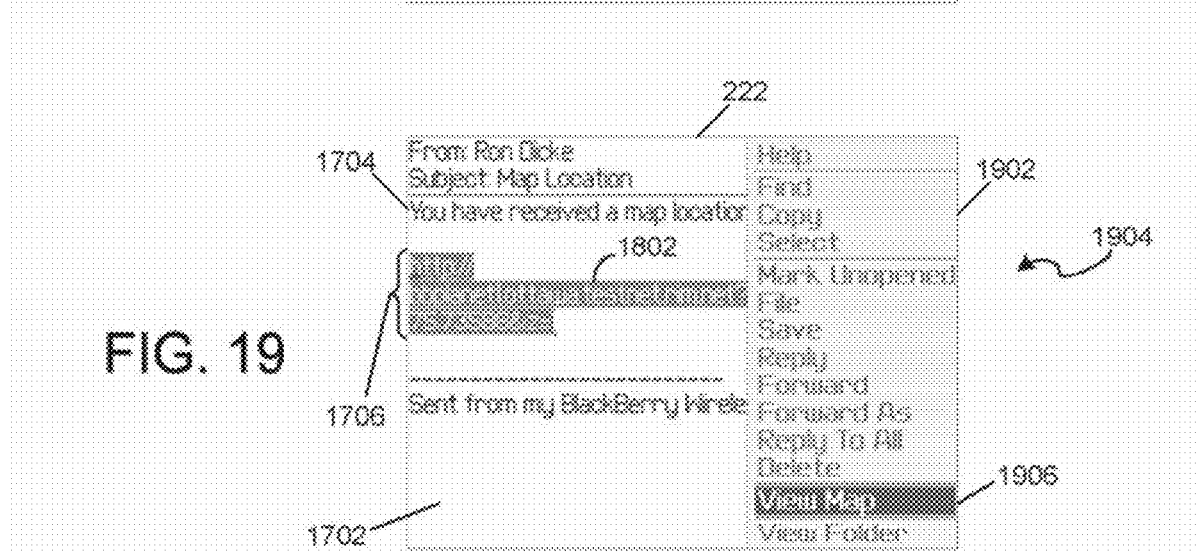
Figure 20:

FIGS. 15-20 are sequential views of display 222 to further illustrate the method of FIG. 9 in connection with the e-mail application. In FIG. 15, a message header list 1506 of received messages (e.g. e-mail messages) is shown in a message header homescreen 1502. In this example, the message header list 1506 of received messages reveals a message header 1504 for a message received from "Ron Dicke." In response to a depression or actuation of the positioning mechanism by the end user during the highlighting of message header 1504, in FIG. 16 it is shown that a pop-up or pull-down list or menu 1602 having a plurality of function identifiers 1604 is displayed over a portion message header homescreen 1502. The end user may subsequently rotate the positioning mechanism to scroll the cursor up/down through the function identifiers 1604 of menu 1602 for highlighting the same one at a time. In FIG. 16, it is shown that the cursor is positioned so as to highlight an "Open" function 1606 in menu 1602. In response to a depression or actuation of the positioning mechanism by the end user while Open function identifier 1606 is highlighted, in FIG. 17 it is shown that the processor causes a received e-mail message 1702 corresponding to message header 1504 to be opened and viewed in display 222. The e-mail message body includes a map location indicia 1704 ("You have received a map location") which prefaces a location URL string 1706 of the type previously described in relation to FIG. 9. Location URL string 1706 corresponds to the location of a map which may be displayed and reads as http://bbplanet1.ottawa.testnet.rim.net?lat=45.40003&lon=-75.73588&z=1. The end user may subsequently rotate the positioning mechanism to scroll the cursor up/down through e-mail message 702 in FIG. 18 to select and highlight 1802 the URL string 1706. In response to a depression or actuation of the positioning mechanism by the end user during the highlighting or selection of URL string 1706, in FIG. 19 it is shown that a pop-up or pull-down list or menu 1902 having a plurality of function identifiers 1904 is displayed over a portion e-mail message 1702. The end user may subsequently rotate the positioning mechanism to scroll the cursor up/down through the function identifiers 1904 of menu 1902 for highlighting the same one at a time. In FIG. 19, it is shown that the cursor is positioned so as to highlight a "View Map" function identifier 1906 in menu 1902. In response to a depression or actuation of the positioning mechanism by the end user while View Map function identifier 1906 is highlighted, in FIG. 20 it is shown that the processor causes a map 2002 of the location corresponding to the URL string to be rendered in display 222. A location marker 2004 is also provided in map 2002 at the exact location specified in the URL string.

Figure 21:
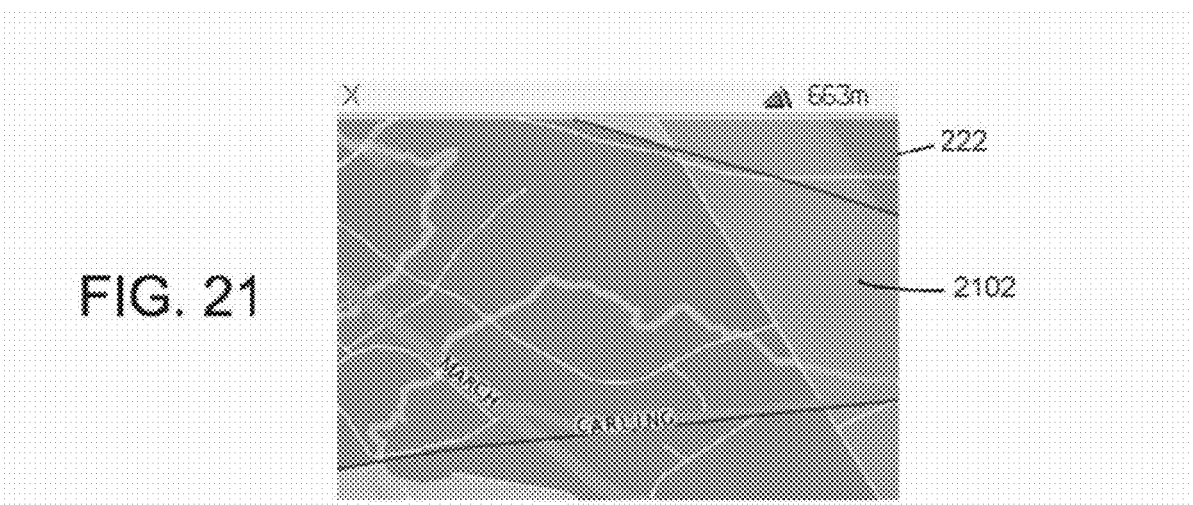
Figure 22:
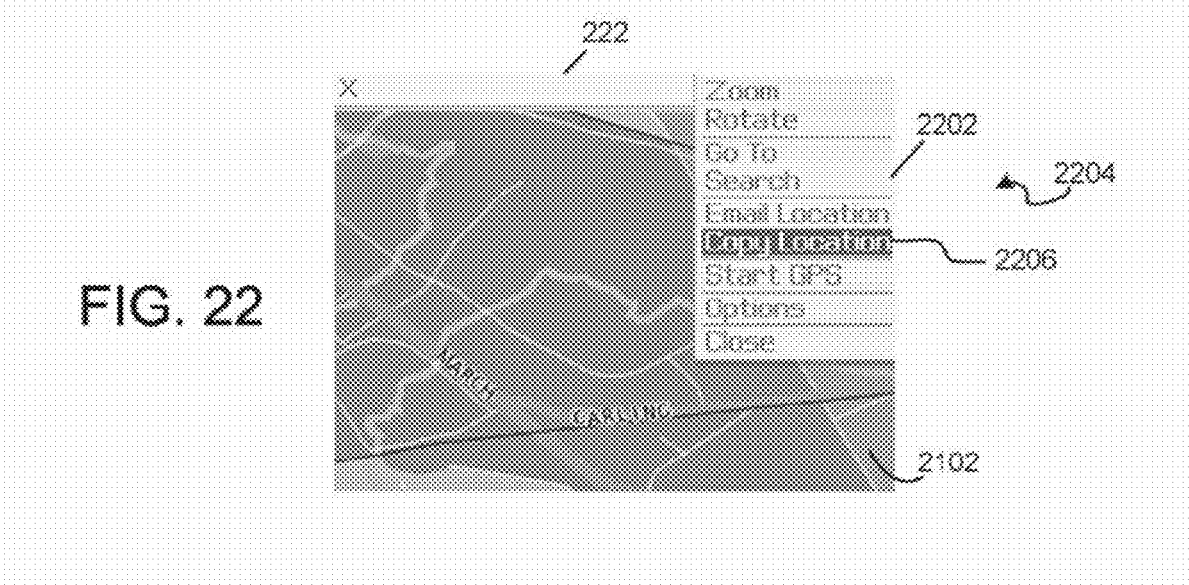
Figure 25:
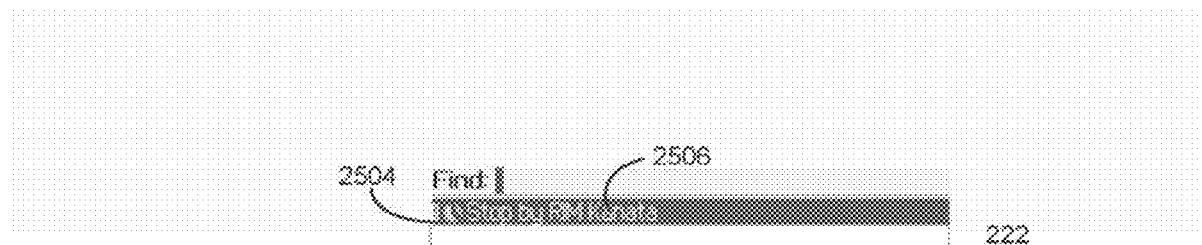
FIGS. 25-29 are sequential views of the display to further illustrate the method of FIG. 9 in connection with a tasks application.

FIGS. 21-24 are sequential views of display 222 to further illustrate the method of FIG. 8 in connection with any file or message using a COPY function and a PASTE function. In FIG. 21, it is shown that a map 2102 of a location is visually displayed in display 222. In response to a depression or actuation of the positioning mechanism by the end user during the display of map 2102, in FIG. 22 it is shown that a pop-up or pull-down list or menu 2202 having a plurality of function identifiers 2204 is displayed over a portion of map 2102. The end user may subsequently rotate the positioning mechanism to scroll the cursor up/down through function identifiers 2204 of menu 2202 for highlighting the same one at a time. In FIG. 22, it is shown that the cursor is positioned so as to highlight an "Copy Location" function identifier 2206 in menu 2202. In response to a depression or actuation of the positioning mechanism by the end user while Copy Location function identifier 2206 is highlighted, the processor causes a location URL string of the type previously described in relation to FIG. 8 to be produced and stored internally in memory into a "copy" buffer. The end user may subsequently open any type of file or message and "paste" the URL string. In FIG. 23, it is shown that the end user has opened the e-mail application and caused a new e-mail message 2302 to be produced and displayed in display 222. The new e-mail message 2302 has a plurality of message fields 2304 as previously described. In response to a depression or actuation of the positioning mechanism by the end user during the display of new e-mail message 2302, in FIG. 23 it is shown that a pop-up or pull-down list or menu 2306 having a plurality of function identifiers 2308 is displayed over a portion of new e-mail message 2302. The end user may subsequently rotate the positioning mechanism to scroll the cursor up/down through function identifiers 2308 of menu 2310 for highlighting the same one at a time. In FIG. 23, it is shown that the cursor is positioned so as to highlight a "Paste" function identifier 2310 in menu 2306. In response to a depression or actuation of the positioning mechanism by the end user while Paste function identifier 2310 is highlighted, it FIG. 24 it is shown that the processor causes the previously-buffered URL string 2402 to be retrieved and copied into the e-mail message body of new e-mail message 2302. The e-mail message body therefore includes URL string 2402 of the type previously described in relation to FIG. 8. URL string 2402 corresponds to the location of map 2102 displayed in FIGS. 21 and 22, and reads as http://bbplanet1.ottawa.testnet.rim.net?lat=45.34335&lon=-75.90660&z=3". In response to a depression or actuation of the positioning mechanism by the end user while a Send function identifier is highlighted, the processor causes new e-mail message 2303 to be sent or communicated to the intended recipient.

Figure 26:
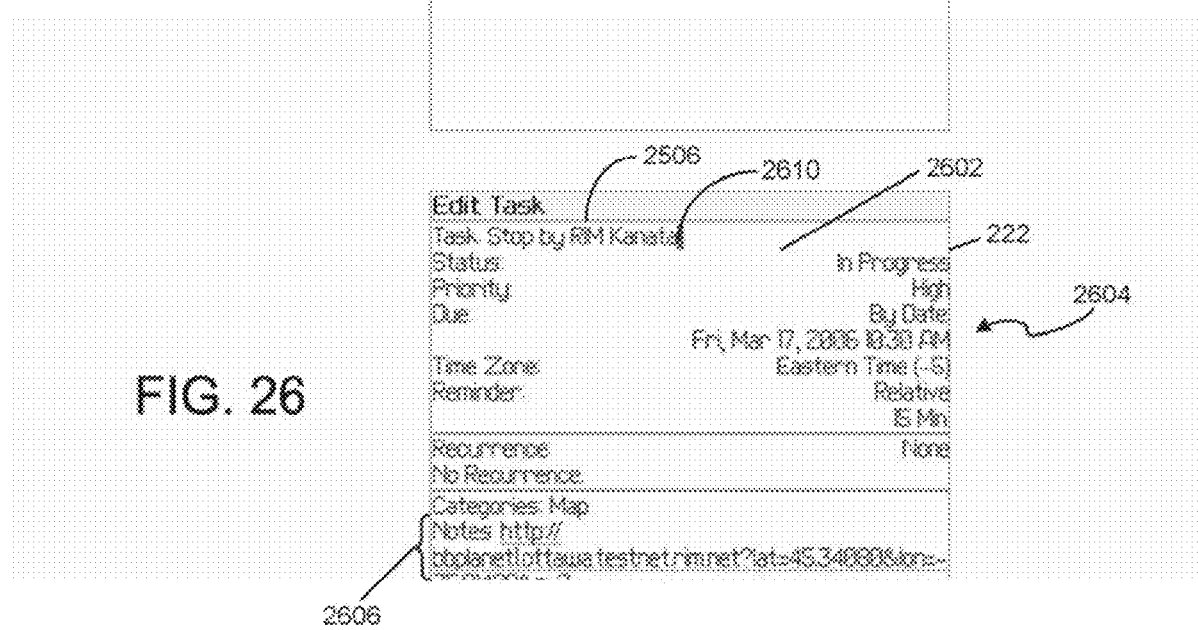
Figure 27:
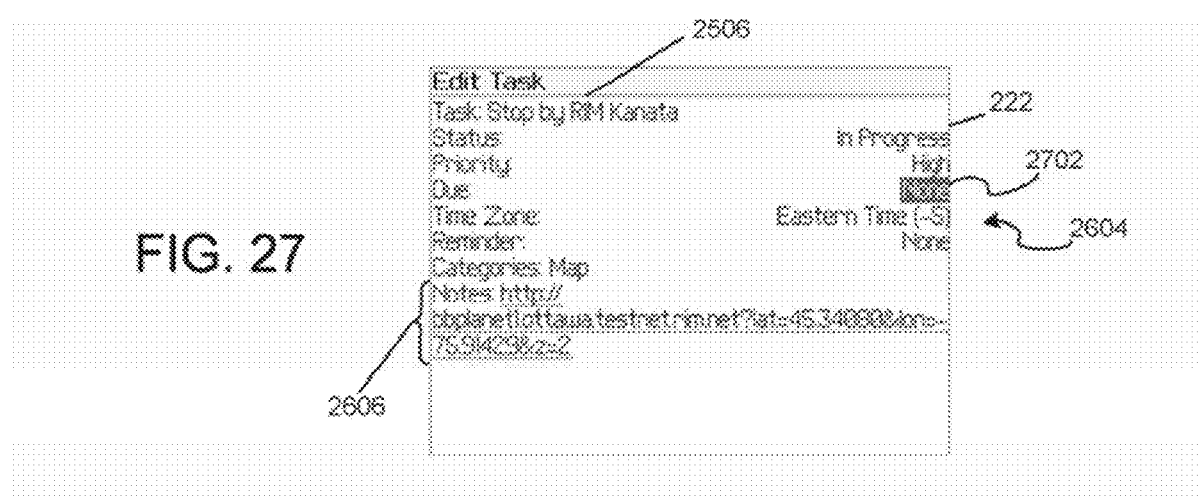
Figure 28:
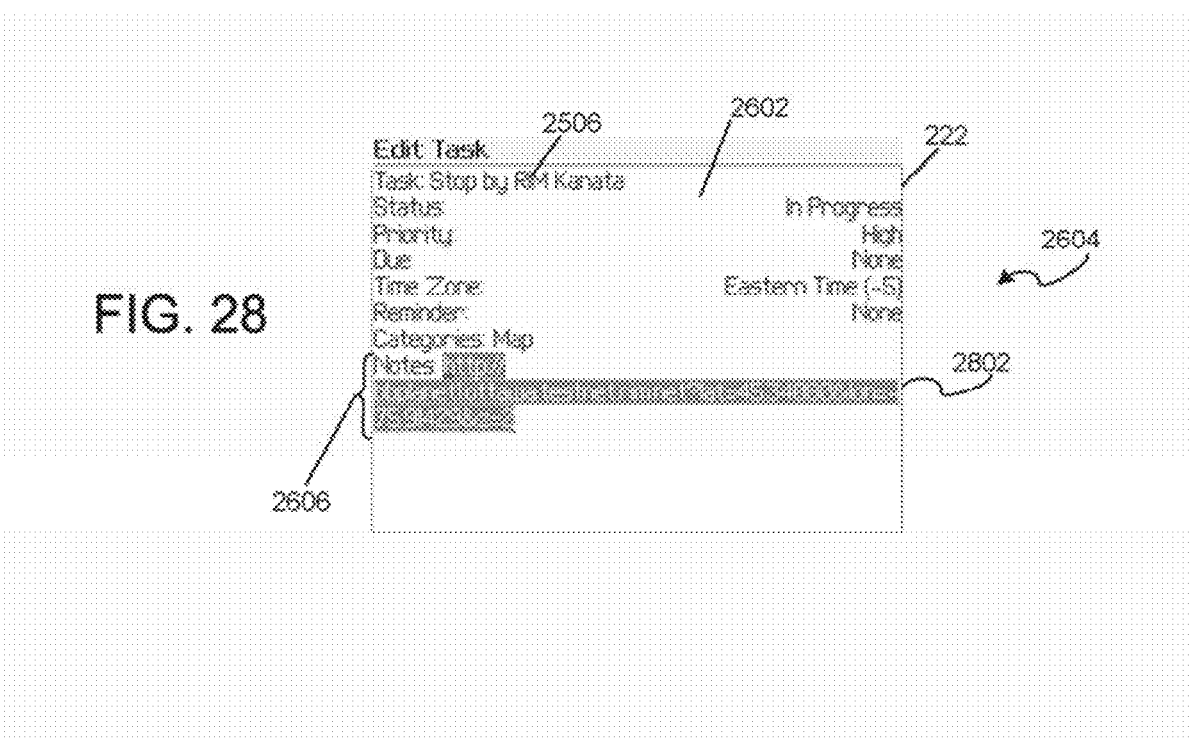
Figure 29:
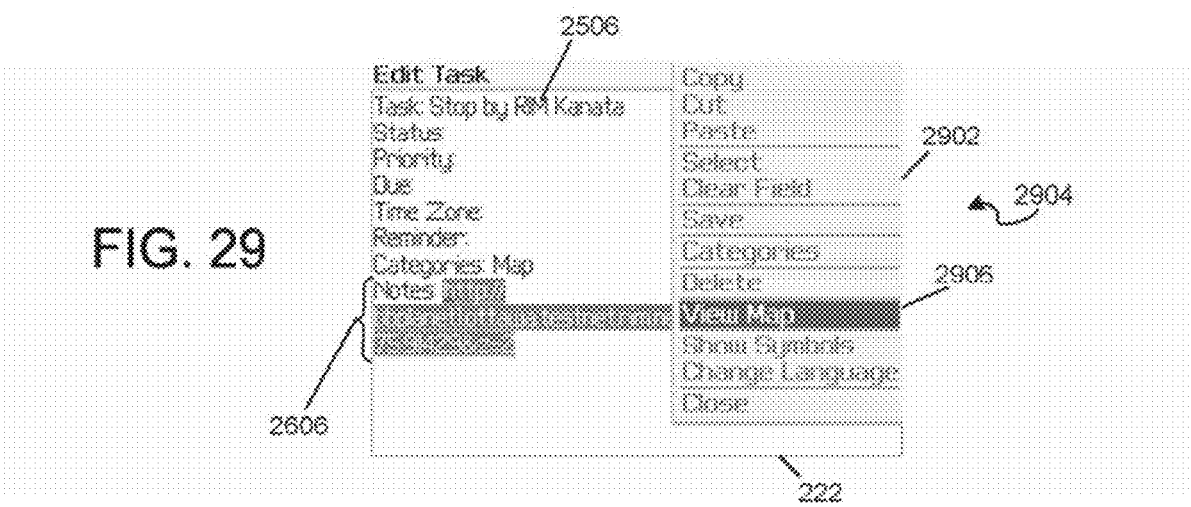
Figure 30:
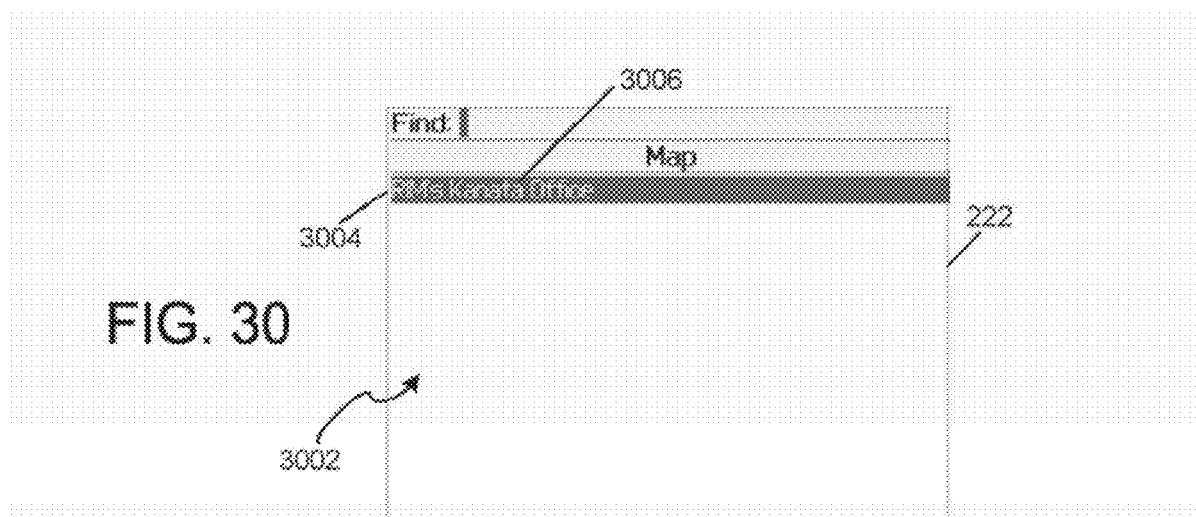
FIGS. 30-34 are sequential views of the display to further illustrate the method of FIG. 9 in connection with a map or location application.

FIGS. 25-29 are sequential views of display 222 to further illustrate the method of FIG. 9 in connection with the tasks application (e.g. tasks application 594 of FIG. 5). After the tasks application is opened or invoked, in FIG. 25 it is shown that a task header list 2502 for a plurality of tasks of the end user is displayed in display 222. In this example, a task item 2504 having a task item identifier 2506 of "Stop By RIM Kanata" is found within task header list 2502. In response to a depression or actuation of the positioning mechanism by the end user while task item 2504 is highlighted, in FIG. 26 it is shown that the processor causes task item 2504 to be opened to display task information 2602 for editing. FIG. 26 shows various task details 2604 associated with task 2602, including a location URL string 2602 of the type previously described in relation to FIG. 9. A cursor 2610 is shown in FIG. 26, which may be further positioned by the end user through task details 2604, so as to highlight other information 2702 in task details 2604 as shown in FIG. 2702. In particular, in FIG. 28 it is shown that the end user may rotate the positioning mechanism to scroll cursor 2802 up/down through the task details 2604 for highlighting URL string 2602. In response to a depression or actuation of the positioning mechanism by the end user during the highlighting of URL string 260, in FIG. 29 it is shown that a pop-up or pull-down list or menu 2902 having a plurality of function identifiers 2904 is displayed over a portion of the task in display 222. The end user may subsequently rotate the positioning mechanism to scroll the cursor up/down through the function identifiers 2904 of menu 2902 for highlighting the same one at a time. In FIG. 29, it is shown that the cursor is positioned so as to highlight a "View Map" function 2906 in menu 2902. In response to a depression or actuation of the positioning mechanism by the end user while View Map function identifier 2906 is highlighted, the processor causes a map of the location indicated by URL string 2606 to be produced in the display.

Figure 31:
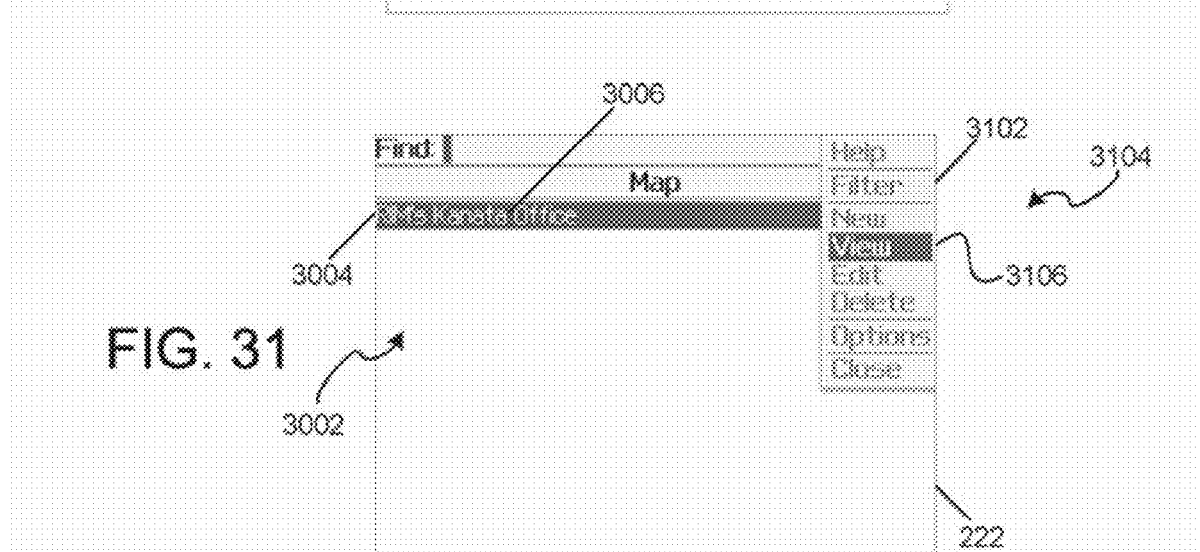
Figure 32:
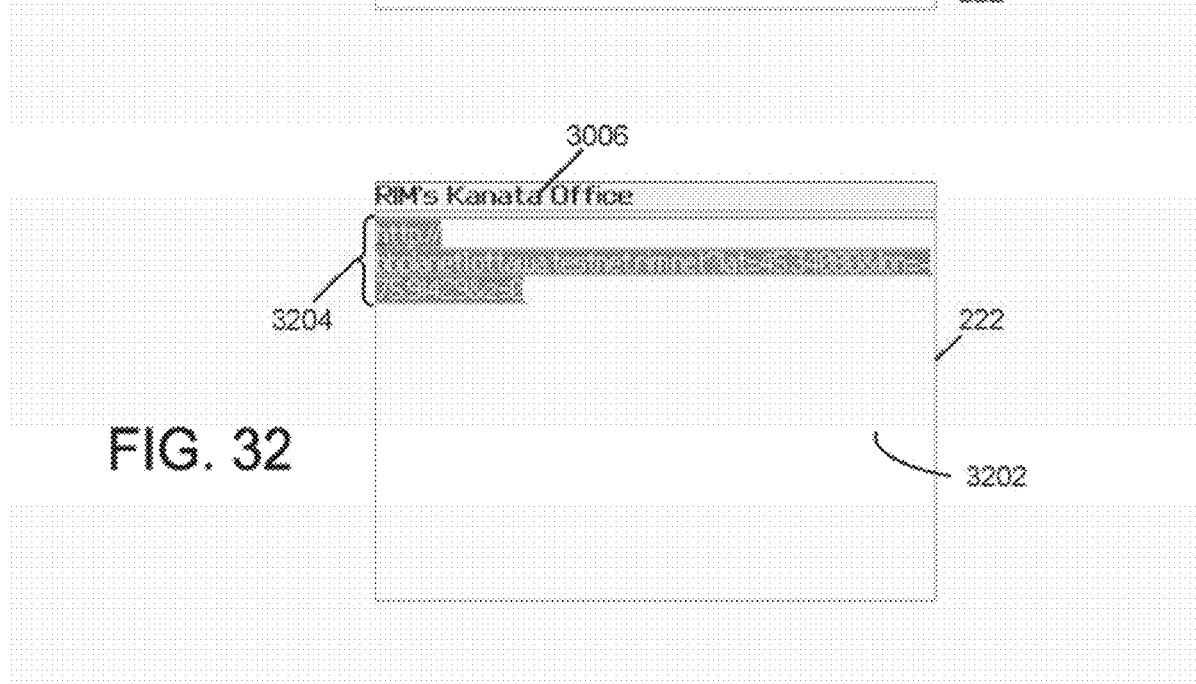
Figure 33:
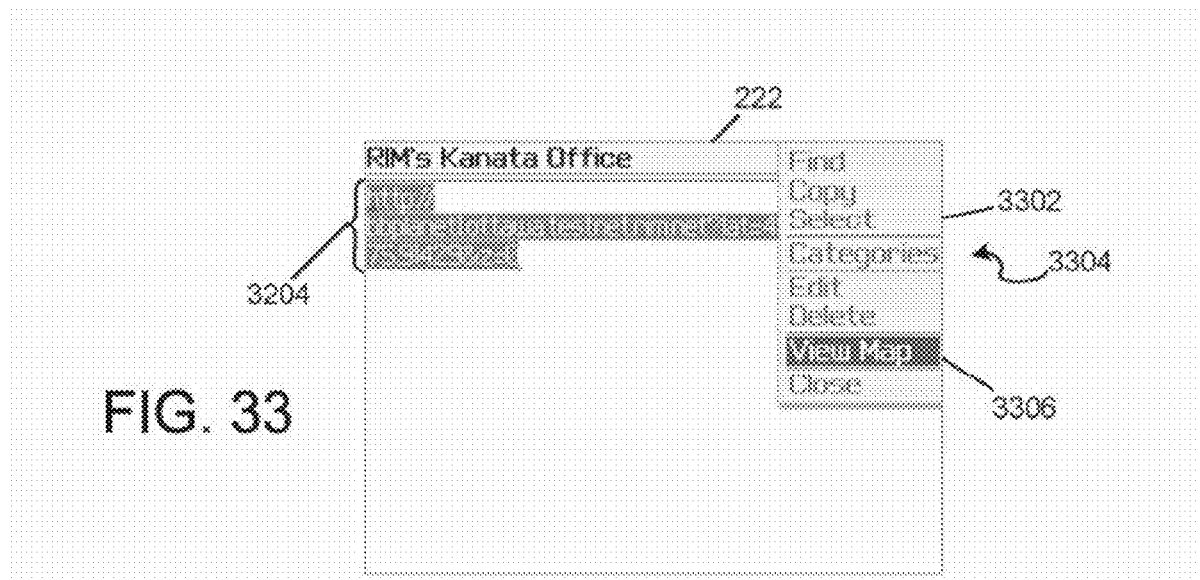
Figure 34:
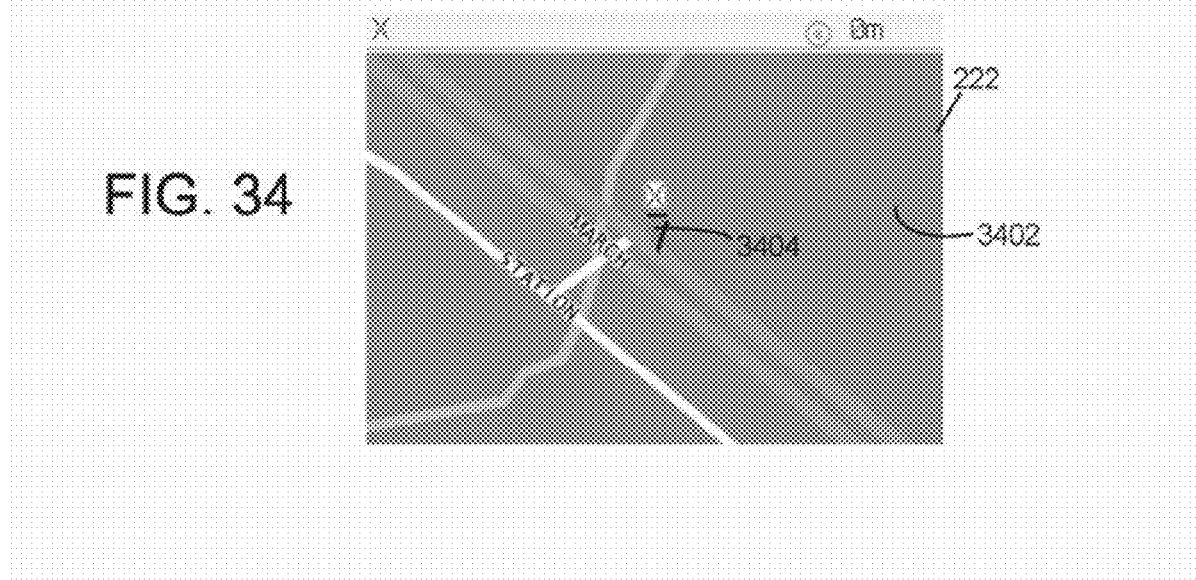

FIGS. 30-34 are sequential views of display 222 to further illustrate the method of FIG. 9 in connection with a map or location application. After the location application is opened or invoked, in FIG. 30 it is shown that a location header list 3002 for a plurality of locations of interest to the end user is displayed in display 222. In this example, a location item 3004 having a location identifier 3006 of "RIM's Kanata Office" is found within location header list 3002. In response to a depression or actuation of the positioning mechanism by the end user while location item 3004 is highlighted, in FIG. 31 it is shown that a pop-up or pull-down list or menu 3102 having a plurality of function identifiers 3104 is displayed in a portion of display 222. The end user may subsequently rotate the positioning mechanism to scroll the cursor up/down through the function identifiers 3104 of menu 3102 for highlighting the same one at a time. In FIG. 31, it is shown that the cursor is positioned so as to highlight a "View" function 3106 in menu 3102. In response to a depression or actuation of the positioning mechanism by the end user while View function identifier 3106 is highlighted, the processor causes location item 3004 to be opened to display location information 3202 for viewing. Notably, FIG. 26 shows a location URL string 3204 of the type previously described in relation to FIG. 9. In response to a depression or actuation of the positioning mechanism by the end user during the highlighting of URL string 3204, in FIG. 33 it is shown that a pop-up or pull-down list or menu 3302 having a plurality of function identifiers 3304 is displayed in a portion of display 222. The end user may subsequently rotate the positioning mechanism to scroll the cursor up/down through the function identifiers 3304 of menu 3302 for highlighting the same one at a time. In FIG. 33, it is shown that the cursor is positioned so as to highlight a "View Map" function 3306 in menu 3302. In response to a depression or actuation of the positioning mechanism by the end user while View Map function identifier 3306 is highlighted, in FIG. 34 it is shown that the processor causes a map 3402 of the location indicated by the URL string to be produced in the display. A location marker 3404 is also provided in map 3402 at the exact location specified by the URL string.

Figures 35, 36, 37:
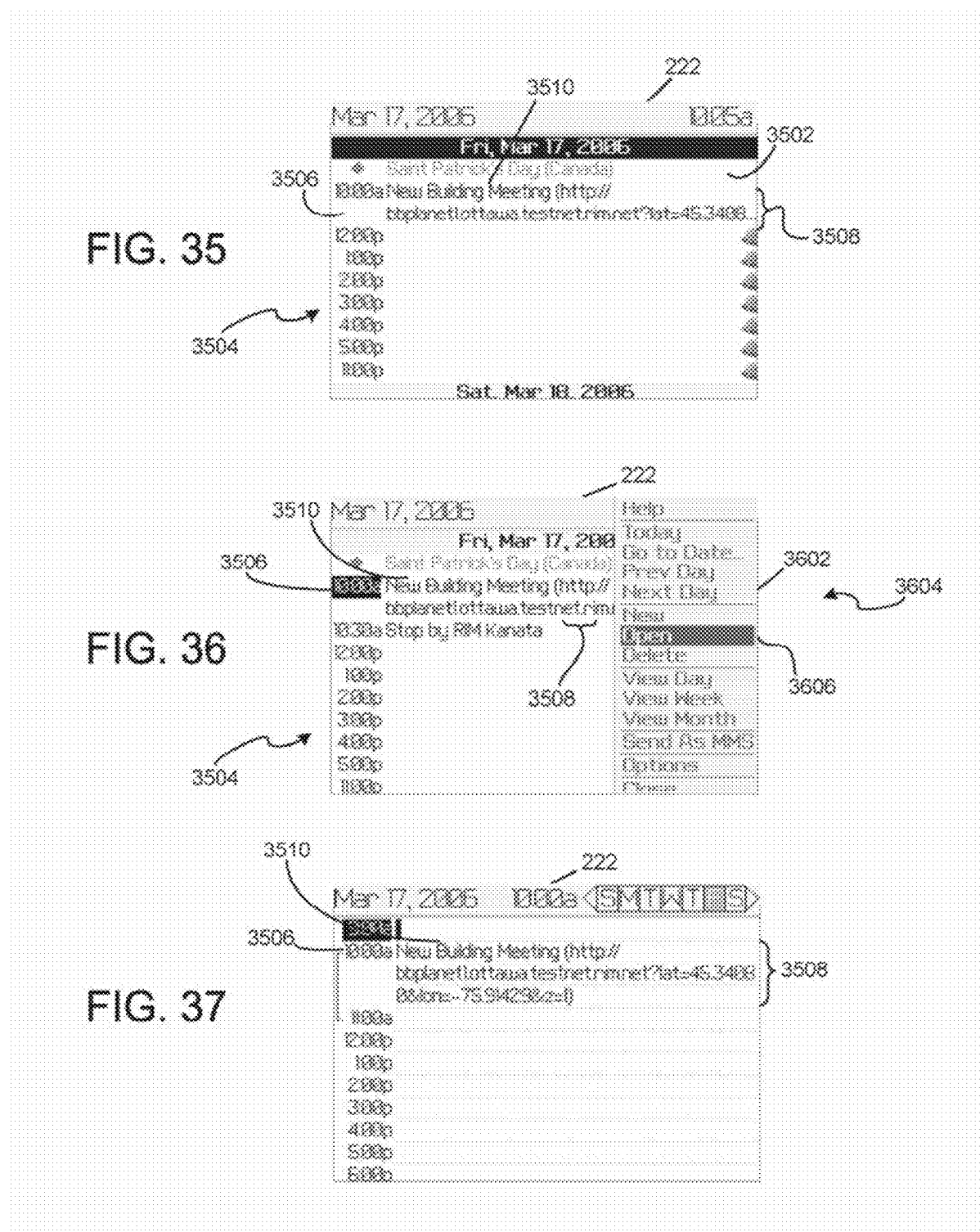
FIGS. 35-43 are sequential views of the display to further illustrate the method of FIG. 9 in connection with a calendar application.
Figures 38, 39, 40:
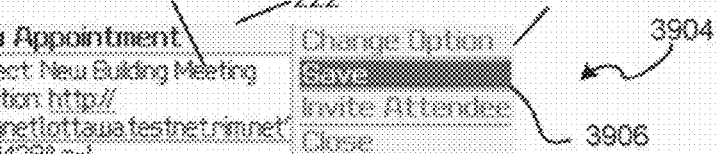
Figure 41:
Figure 42:
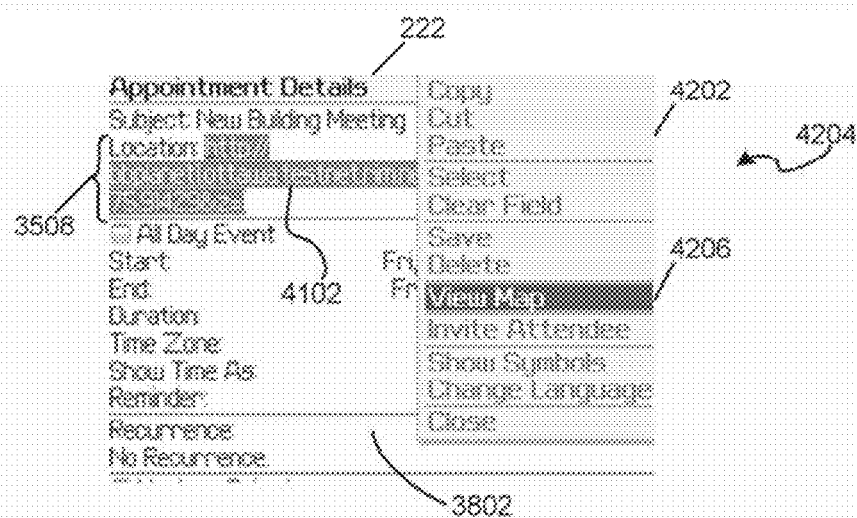
Figure 43:
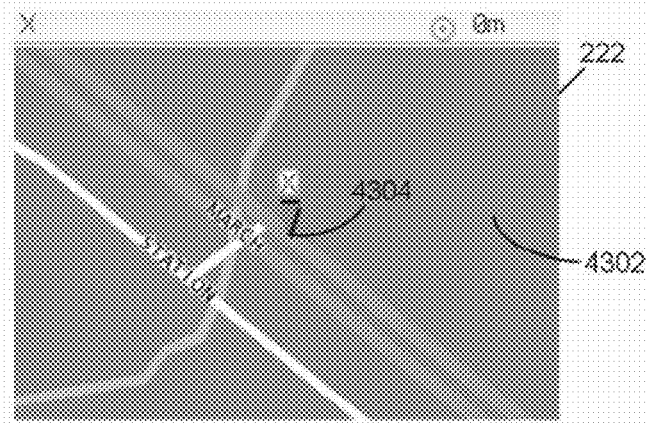

FIGS. 35-43 are sequential views of display 222 to further illustrate the method of FIG. 9 in connection with a calendar application (e.g. calendar application 590 of FIG. 5). After the calendar application is opened or invoked, in FIG. 35 it is shown that a calendar schedule 3502 for a plurality of appointments or meetings 3504 for the end user is displayed in display 222. In this example, a calendar appointment item 3506 having an appointment identifier 3510 for a "New Building Meeting" at around 10:00 AM on Mar. 17, 2006 is displayed. In response to a depression or actuation of the positioning mechanism by the end user while calendar appointment item 3506 is highlighted, in FIG. 36 it is shown that a pop-up or pull-down list or menu 3602 having a plurality of function identifiers 3604 is displayed in a portion of display 222. The end user may subsequently rotate the positioning mechanism to scroll the cursor up/down through the function identifiers 3604 of menu 3602 for highlighting the same one at a time. In FIG. 36, it is shown that the cursor is positioned so as to highlight an "Open" function identifier 3606 in menu 3602. In response to a depression or actuation of the positioning mechanism by the end user while Open function identifier 3606 in menu 3602 is highlighted, the processor causes calendar appointment item 3506 to be opened to display further appointment information for viewing as shown in FIG. 37. The additional appointment information in FIG. 37 more clearly reveals that the appointment details may include a location URL string 3508 corresponding to the location of the meeting. URL string 3508 is of the type previously described in relation to FIG. 9. FIG. 38 reveals that new calendar appointments 3802 may be created with such URL strings 3508 being copied or inserted therein, and saved as shown in FIG. 39 (see e.g. a menu 3902 of a plurality of function identifiers 3904 which include a "Save" function identifier 3906) and FIG. 40, and communicated or sent to other communication devices for scheduled calendar meetings. As shown in FIG. 41, URL string 3508 in calendar appointment 3802 may be highlighted by the end user with use of the positioning mechanism. In response to a depression or actuation of the positioning mechanism by the end user during the highlighting of URL string 3508, in FIG. 42 it is shown that a pop-up or pull-down list or menu 4202 having a plurality of function identifiers 4204 is displayed over a portion of calendar appointment 3802 in display 222. The end user may subsequently rotate the positioning mechanism to scroll the cursor up/down through the function identifiers 4204 of menu 4202 for highlighting the same one at a time. In FIG. 42, it is shown that the cursor is positioned so as to highlight a "View Map" function 4206 in menu 4202. In response to a depression or actuation of the positioning mechanism by the end user while View Map function identifier 4206 is highlighted, it is shown in FIG. 43 that the processor causes a map 4302 of the location indicated by the URL string to be produced in display 222. A location marker 4304 is also provided in map 4302 at the exact location specified by the URL string.

Figure 44:
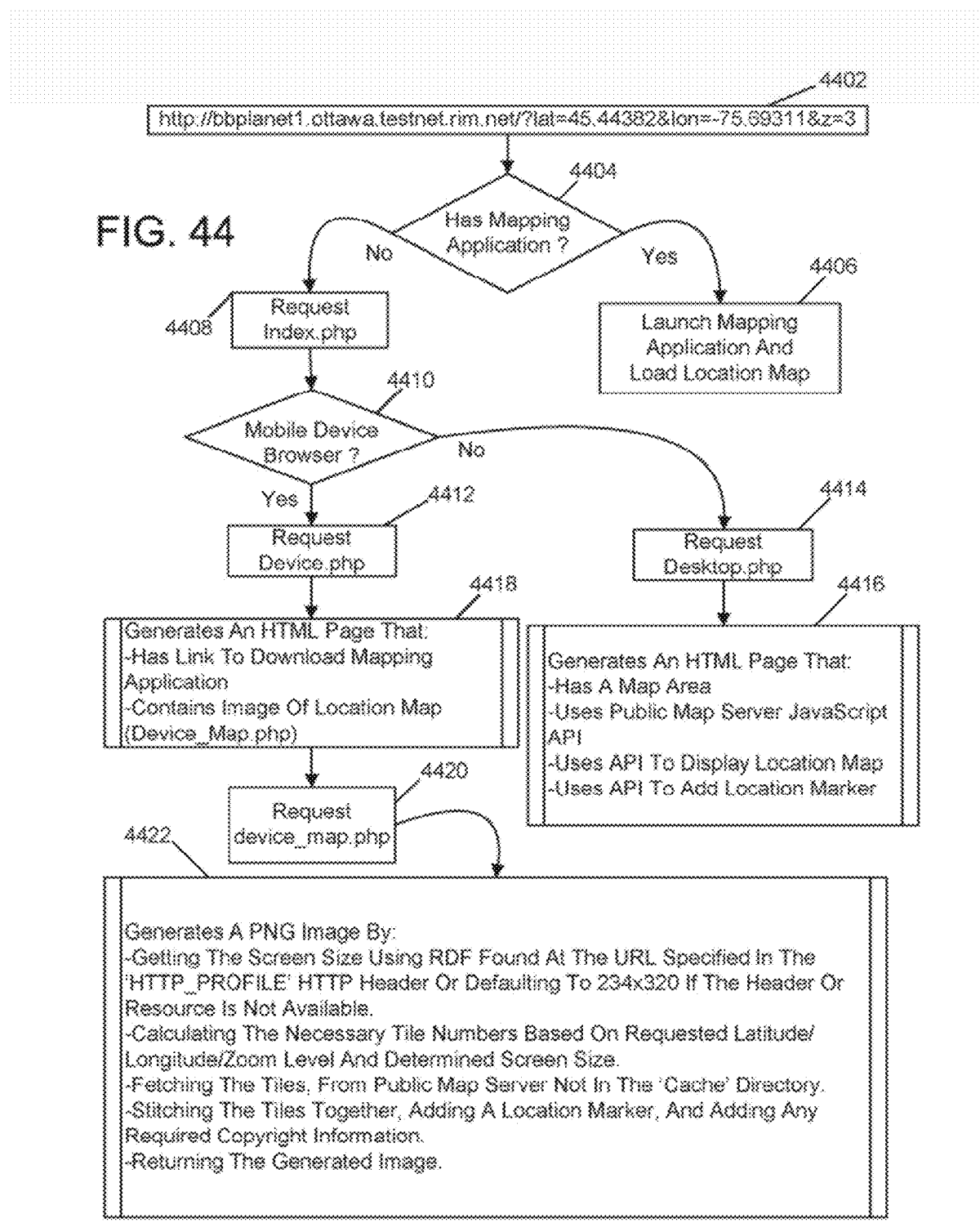
FIG. 44 is a flowchart which describes a method of processing the URL string in accordance with the present disclosure.

FIG. 44 is a flowchart which describes a method for use in processing the URL string for map display in accordance with the present disclosure. The method may be performed by a mobile station as described in relation to the previous figures, or by any other computer or communication device (e.g. a PC). The steps of the method may be performed by one or more processors of the device. Corresponding steps of the method are performed by one or more servers in the communication system. A computer program product may include computer instructions stored on a computer readable medium (memory, a floppy disk or CD-ROM) which are written in accordance with the described logic of this method.

FIG. 45 depicts pertinent components of the communication system within which the method of FIG. 44 may be performed. Reference numerals that are the same as that shown and described in relation to FIG. 3A and elsewhere depict the same or like components. In addition, other network aspects are explicitly shown in FIG. 45 including a computer or communication network such as the Internet 4502, a map coordinating server 4504 having one or more accessible databases 4506, and a public map server 4508 having one or more accessible databases 4510. Map coordinating server 4504 and public map server 4508 are publicly accessible or public servers. Public map server 4508 may be any suitable publicly-accessible map server such as one provided by Yahoo, Expedia, Google, to name but a few. Preferably, public map server 4508 provides for interactive map functionality.

In describing the method of FIG. 44, the steps of the flowchart may be referred to in combination with components in FIG. 45. Beginning with the flowchart of FIG. 44, a URL string of the type specified above is received in an electronic file or message at a computer device (step 4402 of FIG. 44). For example, the URL string may be received in hypertext link format according to one of the methods described previously in relation to FIG. 9, One example of the URL string is revealed in the box in step 4402 of FIG. 44 (e.g. "bbplanet1.ottawa.testnet.rim.net/?lat=45.44328&lon=-75.69311&z=3"). The URL string may be referred to more generally as a hypertext link mapping indicator since alternative indicators may be displayed in its place (e.g. icon or other graphics or text), with the actual URL string being hidden. In this approach, the hypertext link mapping indicator or URL string may be received at one of three different types of computer devices: a computer device such as a personal computer (PC) (desktop or laptop) or mobile communication device which has the predetermined mapping application installed therein (e.g. in FIG. 45, mobile communication device 202 having mapping application 550 operating in carrier network 303); a mobile communication device of the same type above without the predetermined mapping application installed therein (e.g. in FIG. 45, a mobile communication device 4550 operating in carrier network 303); or a computer device such as a PC (desktop or laptop) without the predetermined mapping application installed therein (e.g. in FIG. 45, a computer 4552 connected to the Internet 4502).

In response to an end user selection of the URL string via the user interface, the computer device causes processing associated with the URL string to occur for mapping the location specified in the URL string. If the computer device that processes the URL string has the predetermined mapping application installed as identified at step 4404 (e.g. the computer device is mobile device 202 having mapping application 550 in FIG. 45), then the technique for rending the map is performed with use of the installed mapping application as described earlier above (e.g. see FIGS. 3A-3B and FIG. 8), using map data from the device's cache or obtained from the network server/database as/when needed (step 4406 of FIG. 44). Note that the predetermined mapping application (operating in connection with the associated network server(s) as needed) is optimized and preferred for use with this device in terms of memory usage and processing power and provides an interactive map interface. The computer device having the predetermined mapping application is adapted to make the decision in step 4404 with use of a "URL hook" associated with the URL string which is registered when the mapping application is installed in the device. In response to the end user selection of the URL string, the computer device may identify all or a portion of the selected URL string—e.g. "bbplanet1"—which triggers the mapping functionality in the device. Thus, in response to the end user selection of the URL string for this type of device, a mapping function of the mapping application installed in the device is invoked to render a map of the specified location in the URL string.

If the predetermined mapping application is not installed or provided in the computer device as identified in step 4404 (e.g. the computer device is mobile device 4550 without having the predetermined mapping application in FIG. 45), however, then the processor causes a request for an HTML page to be sent to the server address of the server specified in the URL string (step 4408 of FIG. 44). The server is preferably the map coordinating server 4504 in FIG. 45. In step 4408 of the flowchart, this process is indicated as "request index.php". If the computer device has a predetermined browser type (e.g. mobile device browser) or is a predetermined mobile device type (as tested in step 4410 of FIG. 44 by the map coordinating server), then flow proceeds to step 4412 of FIG. 44. In step 4412, the computer device (e.g. the predetermined type of mobile device—not a PC or laptop computer) receives the HTML data from the map coordinating server and causes the HTML page which contains an image of the map to be displayed (step 4418 of FIG. 44). Since the computer device may be a mobile communication device having relatively limited processing power and memory capability, the map image is preferably a fixed image (e.g. a bitmap, such as a fixed and non-interactive image) or other different type.

The image of the map may be obtained by the map coordinating server through steps 4420 and 4422 of FIG. 44 now described. In steps 4420 and 4422, responsive to the end user's request, the map coordinating server causes a request for the map image to be sent to a server address of a public map server (e.g. public map server 4508 of FIG. 45) (step 4420 of FIG. 44) ("request device_map.php"). In response, a portable network graphics (PNG) image is created and obtained (step 4422 of FIG. 44). Specifically, a screen size is obtained using resource description framework (RDF) identified in the URL string specified in a "HTTP_PROFILE" HTTP header of the request. A default screen size may be provided as an alternative (e.g. defaulting to 234×320) if the header or resource is not available. Tile numbers are calculated based on the requested latitude and longitude coordinates (and zoom) and screen size. Tiles associated with these tile numbers are fetched from the public map server having the tiles stitched together, and assembled with other information such as a location marker and copyright information etc. which are added. The generated image is returned to the requesting computer device by the map coordinating server and displayed in the display of the computer device. Again, the map image displayed in steps 4418, 4420, and 4422 is preferably not provided with an interactive map interface capability but rather merely a fixed image without end user manipulation capability.

The HTML page displayed in step 4418 of FIG. 44 may further contain and display a link (e.g. a hypertext link) to a server address of a download server for downloading the mapping application. Thus, the map coordinating server may produce data to generate this link on the same page as the map image for the mobile communication device. The download server may or may not be the same server as the map coordinating server. The link may be or include an invitation to the end user to download the predetermined mapping application. In response to an end user selection of such link through the user interface, the mobile communication device causes a mapping application download page from the server at the server address to be displayed. From there, a mapping application download for downloading the predetermined mapping application to the computer device may be initiated in response to an end user selection of an associated link. Alternatively, the mapping application download for the predetermined mapping application may be initiated in response to an end user selection of the initial link which is contained and displayed on the same HTML page as the map image.

Next, if the computer device fails to have the predetermined mobile browser type or is not the predetermined mobile device type identified in step 4410 of FIG. 44, then flow proceeds to steps 4414 and 4416 of FIG. 44 for a computer device which is a desktop PC or laptop with relatively larger memory and processing power. In this case, the computer device causes a request to be sent (step 4414) ("request desktop.php") to the server address specified in the URL string (e.g. map coordinating server 4504 of FIG. 45) and an HTML page of a map is obtained and displayed at the communication device in response (step 4416). Although the request was made to the map coordinating server, the request was actually redirected to a public map server (e.g. public map server 4508 of FIG. 45) which provides for interactive mapping ability and functionality (e.g. a Google Maps server associated with a Google Maps application). Thus, communication by the computer device with this other predetermined server may be initiated through a redirection to that server from the map coordinating server. The map of the location is provided in the display of the computer device, where a JavaScript Application Programming Interface (API) may be provided (e.g. Google Maps JavaScript API), and the API may be used to display the location map and add a location marker. Thus, interactive map functionality is provided for computer devices having suitable memory and processing power capabilities.

Advantageously, processing of the received URL string may be handled differently depending on the type of device or whether a predetermined mapping application is installed in the device, so that suitable or optimized mapping functionality is provided in different types of device environments.

Thus, as described herein, a method for use in mapping a location in a computer device includes the steps of receiving an electronic file or message which includes a hypertext link mapping indicator associated with a uniform resource locator (URL) string having a server address and latitude and longitude coordinates; receiving, through a user interface of the computer device, an end user selection of the hypertext link mapping indicator in the electronic file or message; and in response to the end user selection of the hypertext link mapping indicator: if a predetermined type of mapping application is provided in the computer device, invoking a mapping function of the mapping application to produce a map of a location corresponding to the latitude and longitude coordinates for visual display in a display of the computer device (e.g. based on received maplet data); and if the predetermined type of mapping application type is not provided in the computer device, requesting and receiving map data from a map coordinating server identified by the server address of the URL string to produce a map of the location for visual display in the display (e.g. based on a bitmap image). If the predetermined type of mapping application is not provided in the computer device, and the computer device or associated browser is identified as not being that of a mobile communication device (i.e. the computer device has higher processing capabilities), then the computer device causes a request to be sent to the map coordinating server at the server address and, in response to the request, receives a redirection from the map coordinating server to an interactive map server at an interactive map server address and further requests and receives map data from the interactive map server at the interactive map server address to produce a map of the location for visual display in the display. Advantageously, processing of the received hypertext link mapping indicator is handled differently depending on the type of device or whether a predetermined mapping application is installed in the device, so that optimal mapping functionality is provided for different device environments.

The above-described embodiments of the present disclosure are intended to be examples only. Those of skill in the art may effect alterations, modifications and variations to the particular embodiments without departing from the scope of the invention. The invention described herein in the recited claims intends to cover and embrace all suitable changes in technology.

What is claimed is:

1. A method in a wireless communication device for displaying a map, the wireless communication device including a user interface comprising a display, the method comprising:

receiving a message comprising a hypertext link object to a map location;

displaying the message comprising the hypertext link object;

receiving, via the user interface, a selection of the hypertext link object, the hypertext link object being associated with a Uniform Resource Locator (URL) string which consists of a server address, location data corresponding to the map location, and map parameters; and in response to receiving the selection of the hypertext link object, identifying a mapping application trigger within the server address;

invoking the mapping application and displaying a map of the map location.

2. The method of claim 1, wherein the mapping application trigger is a URL hook registered on the device.

3. The method of claim 2, wherein the URL string is registered when the mapping application is installed on the device.

4. The method of claim 1, wherein the hypertext link object is the only link to the map location in the message.

5. The method of claim 3, wherein the hypertext link object is the only link to the map location in the message.

6. A non-transitory computer readable medium comprising instructions in code which when stored in a memory of a wireless communication device and executed by a processor of the wireless communication device causes the wireless communication device to:

receive a message comprising a hypertext link object to a map location;

display the message comprising the hypertext link object;

receive, via the user interface, a selection of the hypertext link object, the hypertext link object being associated with a Uniform Resource Locator (URL) string which consists of a server address, location data corresponding to the map location, and map parameters; and in response to receiving the selection of the hypertext link object, identify a mapping application trigger within the server address;

invoke the mapping application and display a map of the map location.

7. The computer readable medium of claim 6, wherein the mapping application trigger is a URL hook registered on the device.

8. The computer readable medium of claim 7, wherein the URL string is registered when the mapping application is installed on the device.

9. The computer readable medium of claim 6, wherein the hypertext link object is the only link to the map location in the message.

10. The computer readable medium of claim 8, wherein the hypertext link object is the only link to the map location in the message.

11. A wireless communication device comprising:
a processor;
a wireless transceiver coupled to the processor;
a memory coupled to the processor;
a user interface comprising a display;
the processor being configured to:
receive a message comprising a hypertext link object to a map location;
display the message comprising the hypertext link object;
receive, via the user interface, a selection of the hypertext link object, the hypertext link object being associated with a Uniform Resource Locator (URL) string which consists of a server address, location data corresponding to the map location, and map parameters; and
in response to receiving the selection of the hypertext link object, identify a mapping application trigger within the server address;
invoke the mapping application and display a map of the map location.

12. The wireless communication device of claim 11, wherein the mapping application trigger is a URL hook registered on the device.

13. The wireless communication device of claim 12, wherein the URL string is registered when the mapping application is installed on the device.

14. The wireless communication device of claim 11, wherein the hypertext link object is the only link to the map location in the message.

15. The wireless communication device of claim 13, wherein the hypertext link object is the only link to the map location in the message.

* * * * *